United States Patent
Lee et al.

(10) Patent No.: US 7,734,086 B2
(45) Date of Patent: Jun. 8, 2010

(54) REDUCING GHOSTING IN HOLOGRAPHIC STEREOGRAMS

(75) Inventors: Chao Hsu Lee, Singapore (SG); Akira Shirakura, Tokyo (JP)

(73) Assignees: Sony Electronics (Singapore) Pte. Ltd., Singapore (SG); Sony Corporation, Tokyo (JP)

( * ) Notice: Subject to any disclaimer, the term of this patent is extended or adjusted under 35 U.S.C. 154(b) by 1166 days.

(21) Appl. No.: 11/342,979

(22) Filed: Jan. 30, 2006

(65) Prior Publication Data
US 2006/0171583 A1    Aug. 3, 2006

(30) Foreign Application Priority Data
Feb. 1, 2005    (SG) ............................. 200500673

(51) Int. Cl.
*G06K 9/00* (2006.01)
*G06K 9/40* (2006.01)
*G03H 1/00* (2006.01)

(52) U.S. Cl. ............... 382/154; 382/274; 359/1
(58) Field of Classification Search ............... 382/154, 382/232, 274, 275, 284, 285; 348/42; 359/1, 359/23; 345/419
See application file for complete search history.

(56) References Cited

U.S. PATENT DOCUMENTS 6,236,475 B1 * 5/2001 Kihara et al. ............... 359/23
6,512,609 B1 * 1/2003 Klug et al. ................. 359/23

* cited by examiner

*Primary Examiner*—Yon Couso
(74) *Attorney, Agent, or Firm*—Frommer Lawrence & Haug LLP; William S. Frommer; Thomas F. Presson

(57) ABSTRACT

A plurality of source data frames is input into a processor. The plurality of source data frames is sectioned into a plurality of sections which are mapped to form a plurality of pre-distort images. The plurality of pre-distort images is compensated for variations in the degree of saturation (Diffraction Efficiency) to reduce ghosting and compressed to form a plurality of holographic elements, which are recorded onto a holographic recording medium to form a holographic stereogram.

37 Claims, 24 Drawing Sheets $$pAvg_{100, 80} = [(0+0+0\ldots+255+255) + (255+255\ldots+0+0)] / (480 + 640)$$

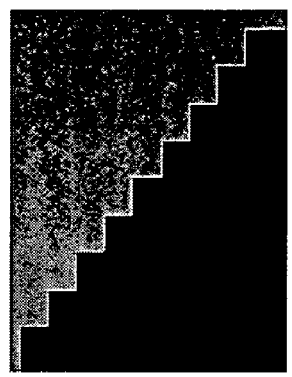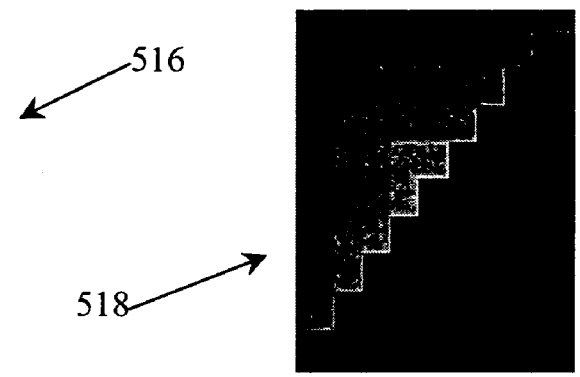
Figure 20(a)  Figure 20(b)
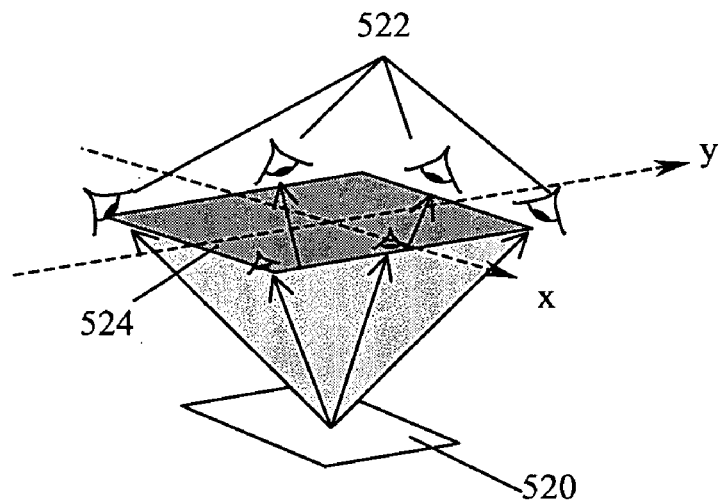
Figure 21
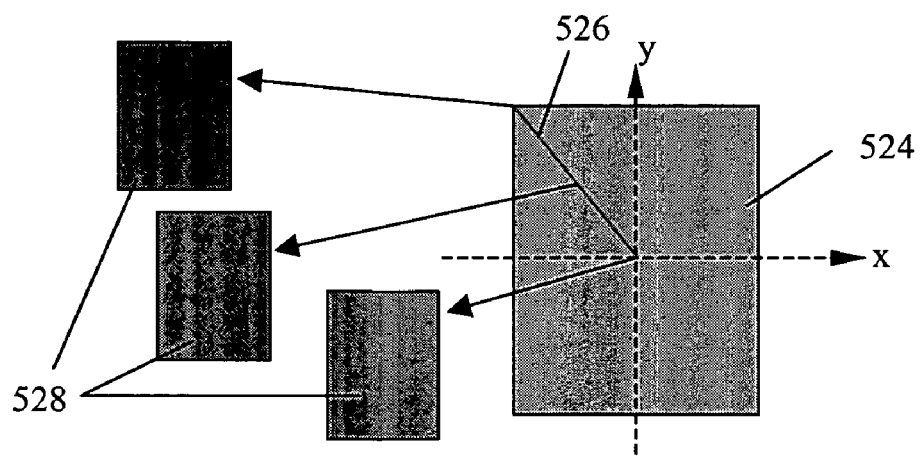
Figure 22

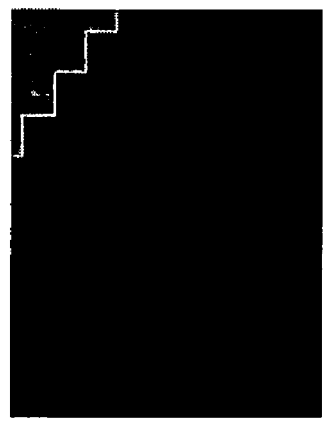
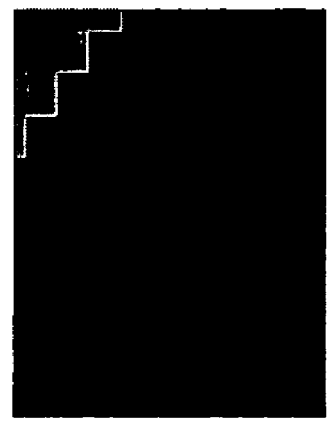
Figure 25(a)　　　　　　Figure 25(b)
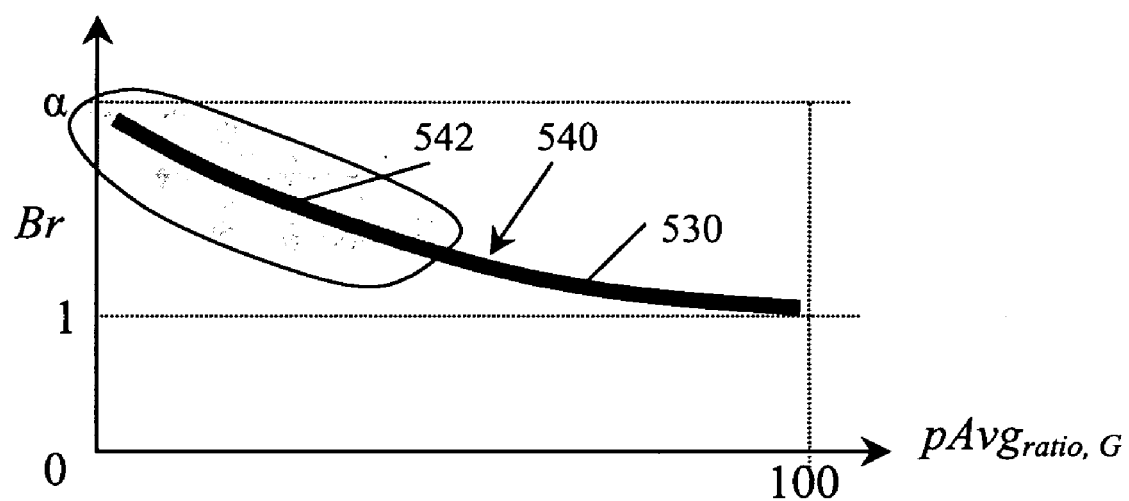
Figure 26

REDUCING GHOSTING IN HOLOGRAPHIC STEREOGRAMS

BACKGROUND OF THE INVENTION

1. Field of the Invention

The present invention relates generally to holographic stereograms. More particularly, the present invention relates to reducing ghosting in holographic stereograms.

2. Description of the Related Art

A holographic stereogram is a type of hologram composed or synthesised from a set of two-dimensional views of a subject which are sequentially recorded as holographic elements (hologels) on a holographic recording medium.

FIG. 1 illustrates a process for forming a horizontal-parallax-only stereogram 10. Source data 12, in the form of a plurality of source data frames 14 containing two-dimensional views of an object 15, is input into a processor 16, where each of the source data frames 14 is sectioned. Each section 18 of the source data frames 14 is then distributed using a re-mapping algorithm (e.g. by the methods of Re-Centring, Panning or Rotating, which refer to the way the subject is captured by a video camera) to form a plurality of pre-distort images 20, which is input into a spatial light modulator (SLM) 22 such as a liquid crystal display (LCD). The pre-distort images 20 are subsequently projected through a converging lens 24 (which tends to be a very complicated assembly of lenses) onto a holographic recording medium 26 such as photopolymer.

The converging lens 24 compresses the pre-distort images 20 into a plurality of holographic elements 28, each of which is sequentially recorded onto the holographic recording medium 26 to form the holographic stereogram 10.

FIG. 2 illustrates a set of source data 12 and a corresponding set of images 30 reproduced from the holographic stereogram 10 generated by the method illustrated in FIG. 1. This is a rough depiction of what the viewer sees in real life. Brightness, contrast, etc. could differ. Ideally, the holographic stereogram 10 provides an accurate reproduction of the source data 12. Often, however, shadows appear in the images 30 reproduced from the holographic stereogram 10 as illustrated in FIG. 2. The presence of "shadows" in the images 30 reproduced from the holographic stereogram 10 is known as ghosting. The ghosting phenomenon reproduces the images 30 inaccurately on the holographic stereogram.

In view of the foregoing, it is desirable to provide a method for forming a holographic stereogram wherein ghosting in images reproduced from the holographic stereogram is reduced or eliminated, in order that the final stereogram images resembles the original images 30 as accurately as possible.

SUMMARY OF THE INVENTION

The present invention provides a method for forming a holographic stereogram and resultant stereograms. It should be appreciated that the present invention can be implemented in numerous ways, including, inter alia, as a process, an apparatus, a system, a device or a method.

According to a first aspect of the invention, a method for forming a holographic stereogram from a plurality of source data frames is provided. A plurality of source data frames is sectioned into a plurality of sections which are mapped to form a plurality of pre-distort images. The plurality of pre-distort images is compensated for variations in saturation and compressed to form a plurality of holographic elements, which is recorded onto a holographic recording medium to form the holographic stereogram.

The plurality of pre-distort images is preferably compensated by applying a compensation algorithm to one or more pixels in the plurality of pre-distort images. The compensation algorithm, for example, adjusts one or more pixels in the plurality of pre-distort images to compensate, at least partially, for the varying degree of saturation when the plurality of holographic elements is recorded onto the holographic recording medium. An attenuation factor may be applied to one or more pixels in the plurality of pre-distort images. For instance, the attenuation factor applied to a pixel may reduce the value for the pixel in relation to pixel values along the same compression axis on the same frame as well as other frames. The attenuation factor applied to a pixel may reduce the value of the pixel to the level of the lowest pixel value along the same compression axis.

Preferably, the method includes establishing a graphical relationship between an averaged pixel value of the plurality of pixels in the plurality of pre-distort images and a brightness of an image reproduced from the holographic stereogram. The averaged pixel value can be averaged across a compression axis of the plurality of pre-distort images. The graphical relationship is preferably established by generating a series of source data frames having colour gradation, sectioning and mapping each of the series of source data frames to form a set of pre-distort images, compressing the set of pre-distort images to form a set of holographic elements, recording the set of holographic elements onto a second holographic recording medium to form the second holographic stereogram, measuring the brightness of the image reproduced from the second holographic stereogram, and plotting a graph of an averaged pixel value of a pixel in the set of pre-distort images against the brightness of the image reproduced from the second holographic stereogram.

The graphical relationship between the averaged pixel value of the plurality of pre-distort test images and the brightness of the image reproduced from the holographic stereogram can be used to predict the brightness of an actual image reproduced from the ultimate holographic stereogram, based on measurements of averaged pixel values from pre-distort images. The pre-distort images can then be compensated based on the predicted brightness.

A weighting factor may be applied to the predicted brightness based on colour. Such a weighting factor may be obtained from a graph of the weighting factor of one colour component in a pixel against the averaged pixel values of other colour components in the pixel. The graph is preferably established by generating a first source data frame and a second source data frame, each having a plurality of sections, each section having a different combination of colour components, the second source data frame having an area of black on one side, deriving a first image and a second image from the first source data frame and the second source data frame, respectively, generating a reference ratio from a reference section in the second image, generating a ratio for each remaining section in the second image, dividing the ratio for each remaining section by the reference ratio to obtain a co-ordinate along a weighting factor axis, and plotting a plurality of points, each represented by one co-ordinate along the weighting factor axis and one co-ordinate along each averaged pixel value axis of the other colour components in the pixel, to form the graph.

According to a second aspect of the invention, a method for use in reducing ghosting in holographic stereograms is provided. Where a plurality of source data frames have been sectioned and the resulting sections mapped to form a plurality of pre-distort images, the plurality of pre-distort images is compensated for variations in saturation.

According to a third aspect of the invention, a method of altering pre-distort images for forming a holographic stereogram from a plurality of source data frames is provided. The pre-distort images having been provided by sectioning the source data frames into a plurality of sections and mapping the plurality of sections to form a plurality of pre-distort images, the plurality of pre-distort images are compensated for variations in saturation.

The second and third aspects may include, prior to compensating the plurality of pre-distort images, sectioning the plurality of source data frames into the plurality of sections, and mapping the sections to form the plurality of pre-distort images. The third and fourth aspects may include, after compensating the plurality of pre-distort images, compressing the compensated pre-distort images to form a plurality of holographic elements, which are recorded onto a holographic recording medium to form the holographic stereogram.

According to a fourth aspect of the invention, a holographic stereogram is provided, formed by the method of any of the first to third aspects.

According to a fifth aspect of the invention, there is provided apparatus for forming a holographic stereogram from a plurality of source data frames. The apparatus comprises: means for sectioning a plurality of plurality of source data frames into a plurality of sections; means for mapping the plurality of sections to form a plurality of pre-distort images; and means for applying a compensation algorithm to one or more pixels in the plurality of pre-distort images to compensate for variations in saturation.

According to a sixth aspect of the invention, a computer system for forming a holographic stereogram from a plurality of source data frames is provided. The computer system comprises an external device interface for receiving the plurality of source data frames. A processor coupled to the external device interface sections and maps the plurality of source data frames to form a plurality of pre-distort images. A memory coupled to the processor stores a compensation algorithm which is applied to one or more pixels in the plurality of pre-distort images to compensate for variations in saturation.

According to a seventh aspect of the invention, a computer program product for forming a holographic stereogram from a plurality of source data frames is provided. The computer program product comprises computer-readable program code for sectioning and mapping the plurality of source data frames to form a plurality of pre-distort images, and computer-readable program code for compensating the plurality of pre-distort images for variations in saturation.

The apparatus of the fifth aspect, the computer system of the sixth aspect and the computer program product of the seventh aspect may all operate according to the method of any of the first to third aspects.

Other aspects and advantages of the invention will become apparent from the following detailed description, taken in conjunction with the accompanying drawings, illustrating, by way of example, the principles of the invention.

BRIEF DESCRIPTION OF THE DRAWINGS

The present invention may be more readily understood by the following detailed description of non-limiting exemplary embodiments, in conjunction with the accompanying drawings. To facilitate this description, like reference numerals designate like structural elements.

FIGS. 20(a) and 20(b) illustrate, respectively, a pre-distort image and an uncompensated hologel generated from the first set of reference data frames, of FIG. 19;

FIG. 21 is a perspective view of a viewing plane and a full parallax holographic stereogram print;

FIG. 22 is a top plan view of a viewing plane of a full parallax holographic stereogram print;

FIGS. 25(a) and 25(b) illustrate, respectively, a pre-distort image and an uncompensated hologel generated from the second set of reference data frames, of FIG. 24;

FIG. 26 is a combined graph generated from the first set of reference data frames of FIG. 19 and the second set of reference data frames, of FIG. 24;

DETAILED DESCRIPTION OF THE PREFERRED EMBODIMENTS

A new approach for forming a holographic stereogram is described. In the following description, numerous specific details are set forth in order to provide a thorough understanding of the present invention. It will be understood, however, to one skilled in the art, that the present invention may be practised without some or all of these specific details. In other instances, well known process operations have not been described in detail in order not to obscure the details of the embodiments of the present invention unnecessarily.

In the course of studying the ghosting phenomena in holographic stereograms, the inventors determined that the ghosting phenomenon occurs when holographic elements are recorded onto a holographic recording medium. The ghosting was found to result from the non-linear characteristic of the recording medium, thus leading to variations in the saturation levels. This gives the impression of 'contamination' of the holographic elements, seemingly, by data from adjacent source data frames.

The mechanism that gives rise to the ghosting results from limitations in the recording material (e.g. the photopolymer). The Diffraction Efficiency (brightness) of the photopolymer does not increase linearly or indefinitely with an increase of laser power falling on the photopolymer. If the power falling on a hologel is low (as is determined by the pre-distort image) the performance of the photopolymer is not 'strained'. On the other hand, if, the power falling on a hologel is high (as is determined by the pre-distort image with high palette values) the performance of the photopolymer will be 'strained' and quickly reach its performance limits, that is it saturates.

Figure 1:
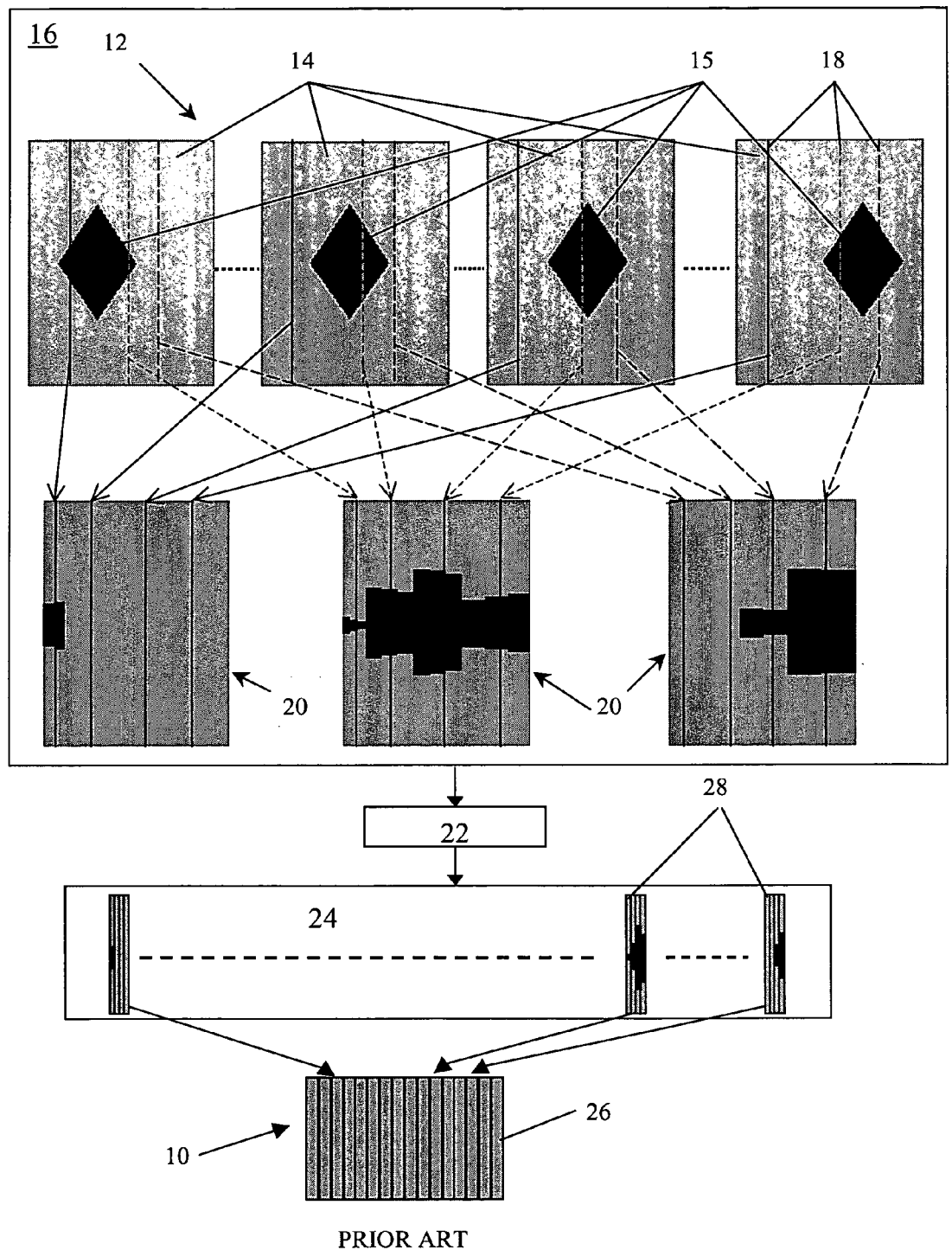
FIG. 1 illustrates a process for forming a holographic stereogram in accordance with the prior art.
Figure 2:
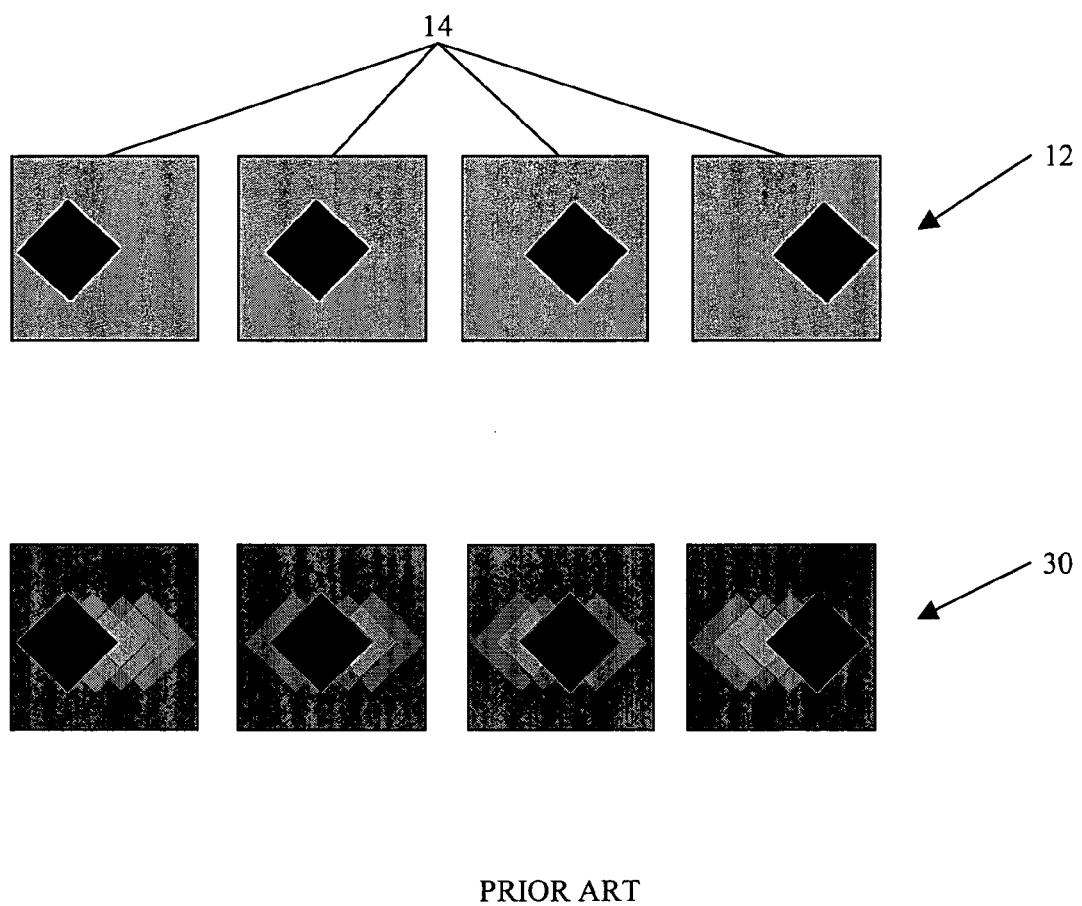
FIG. 2 illustrates ghosting in an image reproduced from a holographic stereogram in accordance with the prior art.
Figure 3A:
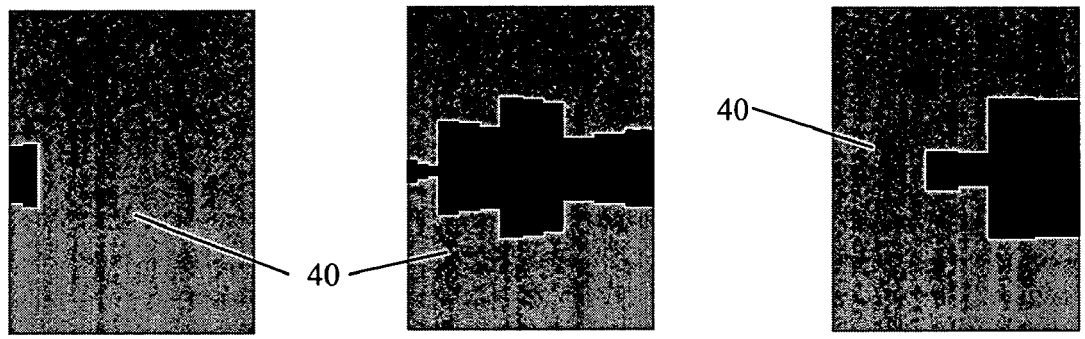
FIG. 3(a) illustrates a series of pre-distort images in accordance with the prior art.
Figure 3B:
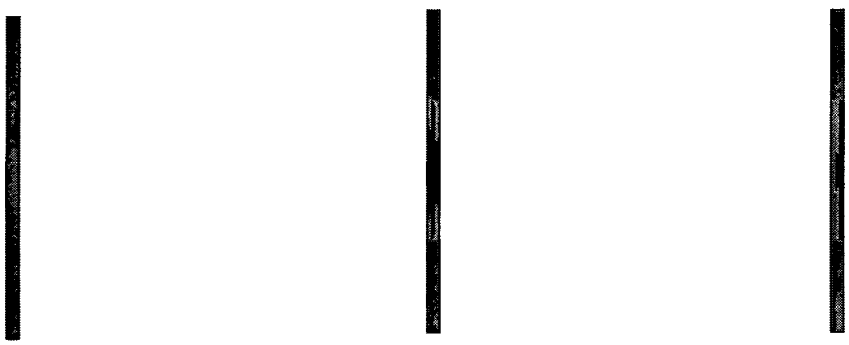
FIG. 3(b) illustrates a series of holographic elements formed from the series of pre-distort images in FIG. 3(a) as recorded onto a holographic recording medium in accordance with the prior art.
Figure 3C:
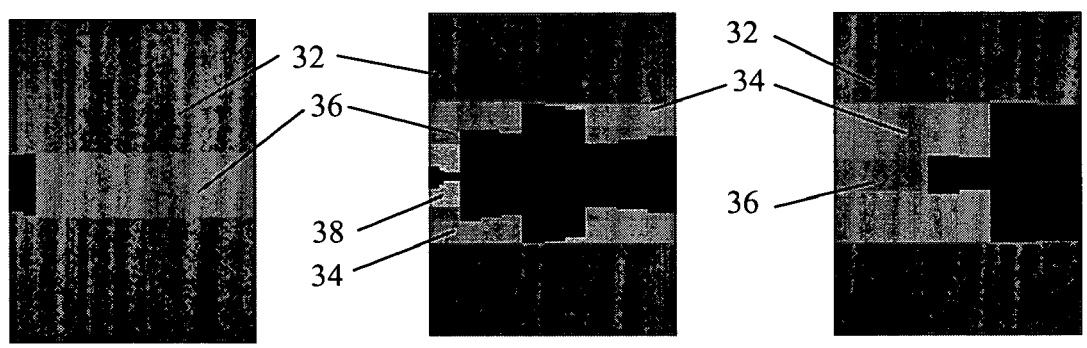
FIG. 3(c) illustrates the series of holographic elements of FIG. 3(b) in an uncompressed form in accordance with the prior art.

FIGS. 3(a) to 3(c) illustrate the changes which occur when a series of pre-distort images is recorded as holographic elements on a holographic recording medium in accordance with a prior art process. In particular, FIG. 3(a) illustrates a series of pre-distort images, FIG. 3(b) illustrates a series of holographic elements formed from the series of pre-distort images in FIG. 3(a) as recorded onto a holographic recording medium, while FIG. 3(c) illustrates the series of holographic elements of FIG. 3(b) in a stretched-out form to represent the pre-distort images.

Saturation, (i.e. the tapering-off or levelling-off of the brightness with the increase in laser power falling on the recording medium) is observed in the holographic elements recorded onto the holographic recording medium. However, due to the occurrence of ghosting, the pixels making up the holographic elements are saturated to varying degrees. In particular, the ghosting phenomenon exhibits the degree of saturation of some of the pixels making up the holographic elements. Consequently, multiple shades 32, 34, 36, 38 of a solid colour 40 in the pre-distort images are observed in the holographic elements.

To reduce the ghosting phenomenon, the inventors have devised a compensation algorithm which is applied to the pre-distort images to compensate for variations in the degree of saturation of the pixels resulting from the ghosting phenomenon, by adjusting relevant pixel values by relevant amounts in the pre-distort images. The algorithm reduces certain pixel values, in anticipation of saturation further down the process. The compensation algorithm may be written into a software for a processor which generates the pre-distort images based on the source data.

Figure 4A:
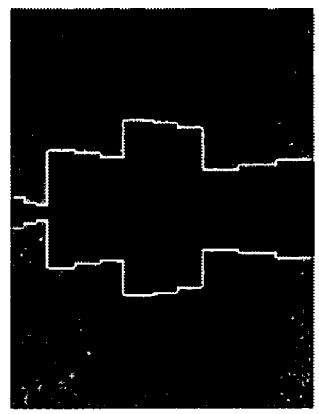
FIG. 4(a) illustrates a pre-distort image prior to application of a compensation algorithm in accordance with an embodiment of the present invention.

FIG. 4(a) illustrates a pre-distort image prior to application of the compensation algorithm in accordance with one embodiment of the present invention. The pre-distort images may be derived in the same way as in the prior art, from source data.

It should be noted that, although only four source data frames are used in this embodiment, there may be more than four or fewer than four. Typically, there may be between 150 and 225 such frames. Likewise, although only four pre-distort frames are shown in this example (out of a total of 50), there may be many more. The number of pre-distort frames in the compression axis is the number of hologels in that same axis for the holographic stereogram being generated. For example, if the final holographic stereogram is to be 45 mm wide and each hologel is 0.2 mm wide, there will be 225 hologels, requiring 225 pre-distort images. On the other hand, if the final holographic stereogram is to be 10 mm wide and each hologel is 1.0 mm wide, there will be 10 hologels, requiring 10 pre-distort images.

The source data may be in any of a variety of formats, for example, bit-mapped graphic (BMP), Joint Photographic Experts Group (JPEG) or Audio Video Interleaved (AVI). Correspondingly, each source data frame may be an individual bitmap image in a sequential BMP stream, a single JPEG image file or a video still in an AVI file.

Figure 4B:
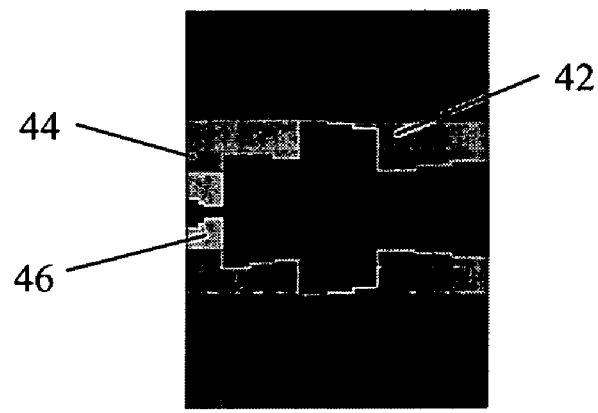
FIG. 4(b) illustrates a compensated pre-distort image in accordance with an embodiment of the present invention.

FIG. 4(b) illustrates a compensated pre-distort image in accordance with one embodiment of the present invention. Due to the ghosting phenomenon, the pixels in the top and bottom regions in FIG. 4(b), where the average pixel value is highest, are more saturated than the pixels in the middle regions 42, 44, 46. If left unadjusted, the middle regions 42, 44, 46 will appear brighter than the top and bottom regions. Therefore, the values of the pixels in the middle regions 42, 44, 46 are reduced so that they are not as saturated as the top and bottom regions. This leads the middle regions to match the top and bottom regions, so that the pixel values for any one colour (green in this case) are the same (e.g. R0,G255,B0 for green) in the final holographic stereogram.

Figure 4C:
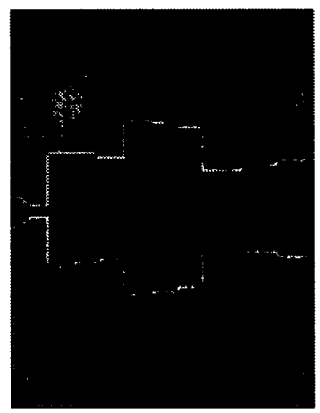
FIG. 4(c) illustrates an uncompressed holographic element formed from the compensated pre-distort image in FIG. 4(b)

FIG. 4(c) illustrates an uncompressed holographic element formed from the compensated pre-distort image in FIG. 4(b) in accordance with one embodiment of the present invention. Because the reduced degree of saturation of some of the pixels making up the holographic element has been compensated for, a solid colour is observed around the portions corresponding to the imaged object, in the uncompressed holographic element.

The inventors derived the following compensation equation, Equation (1), to adjust the affected pixels of the pre-distort images so as to compensate for the subsequent reduced degree of saturation when the holographic elements formed from the pre-distort images are recorded onto the holographic recording medium:

$$palette_{New} = palette \times atten \quad (1),$$

where $palette_{New}$ represents a compensated pixel value of a pixel in a pre-distort image, palette represents an original pixel value of the pixel in the pre-distort image, and atten represents an attenuation factor which determines the degree to which palette is to be adjusted in order to reduce the ghosting phenomenon.

Each pixel may be represented by three numerical components: a red component, a green component and a blue component. Each numerical component is indicative of the intensity of a particular colour component in the pixel. Accordingly, the pixel value, comprising values for each component colour, is indicative of the colour of the pixel.

The number of distinctive colours that can be represented by the pixel depends on the number of bits per pixel (bpp). In a 24-bpp pixel format, each of the red-green-blue (RGB) components comprises an 8-bit byte having a numerical value ranging from 0 to 255. Therefore, a pixel in the 24 bpp mode can have 16,777,216 colours. For example, a pixel having a value of (0, 0, 0), meaning (Red=0, Green=0, Blue=0), is black, a pixel having a value of (255, 255, 255) is white, a pixel having a value of (255, 0, 0) is red, a pixel having a value of (255, 255, 0) is yellow, while a pixel having a value of (255, 165, 0) is orange.

For the purposes of illustrating the present invention, embodiments of the present invention are described in the 24-bpp mode. Nonetheless, it will be appreciated that the invention is also applicable to other modes such as, for example, an 8 bpp pixel format in which a pixel can have 256 colours, or a 16 bpp pixel format in which a pixel can have 65,536 colours, amongst others.

The aim of the attenuation factor, atten, is to reduce the actual pixel value of a pixel in the pre-distort image, palette, to the lowest pixel value among the holographic elements recorded onto the holographic recording medium (other than for the pixels representing the object).

Assuming the source images have only one shade of one colour (ignoring the object itself). If the original source images have only one shade, the final hologel print should only have one shade. The multiple shades should be eliminated so that only one shade exists. The approach can be simplified to two steps:

step 1: identify the darkest shade; and step 2: reduce the brightness of any lighter shades to match that of the darkest shade.

The middle hologel (stretched), from FIG. 3(c) illustrates four different shades, the darkest shade 32, in bands at the top and bottom of the image, with three lighter bands 34, 36, 38 towards the centre, the lightest band at the centre and the second lightest next to the darkest bands 32. The aim is to reduce the brightness of the three lighter bands in the hologel that is printed, so that they all match the target shade, which is the darkest shade 32. The desired uniform shade is shown in FIG. 4(c).

The lowest pixel value of the holographic element is dependent on the performance of the holographic recording medium. Where the intensity of light falling on a holographic recording medium is constant, a brighter holographic element is formed on a better performing holographic recording medium. The performance of the recording material is affected by such factors as the laser power to which it is exposed.

How well the recording material performs can be seen easily on the holographic stereogram print. The brighter the holographic image, the better the performance of the recording material. This performance is commonly referred to as the Diffraction Efficiency (DE) of the recording material. Simply stated, the higher the DE, the more light is reflected, and the brighter the image appears to the observer. Different portions of the recording material will have different Diffraction Efficiencies once a holographic stereogram is recorded thereon.

The attenuation factor, atten, is found by first establishing a relationship between averaged pixel values along a compression axis of a pre-distort image, pAvg, and a degree of brightness of a corresponding pixel on an image reproduced from an uncompensated holographic stereogram, Br. The relationship is preferably determined for the same holographic recording material as that to be used for recording the subject hologram. Once the relationship between pAvg and Br is established, the brightness of the individual pixels making up an uncompensated holographic element can be predicted given the averaged pixel values, pAvg, of the pixels making up a corresponding pre-distort image. The pixels affected by the ghosting phenomenon can then be adjusted to an appropriate degree to compensate for the inaccurate brightness value when the holographic element is recorded onto the holographic recording medium.

Figure 5:
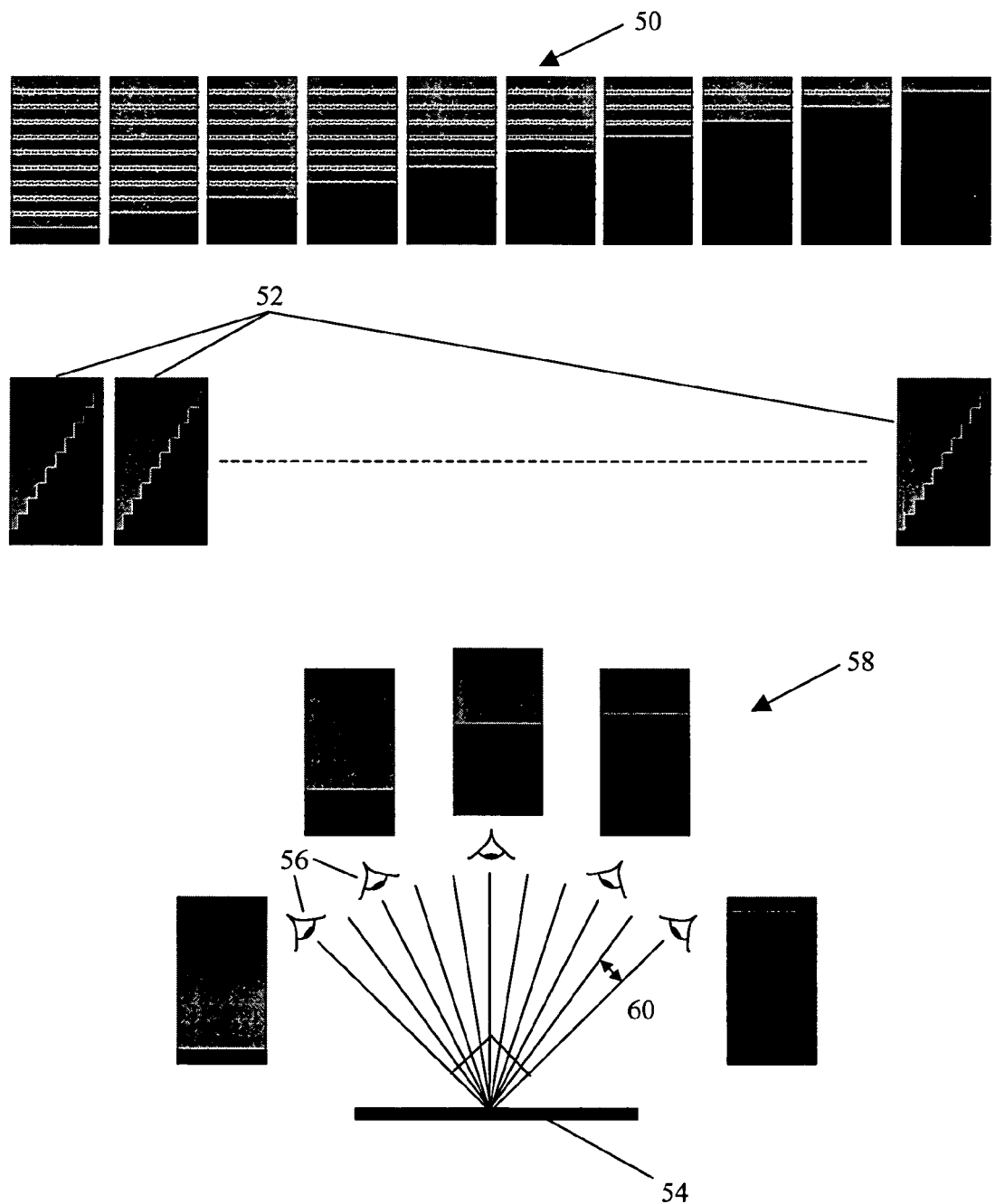
FIG. 5 illustrates a method for establishing a relationship between pAvg and Br for one of the RGB components.

FIG. 5 illustrates part of a method for establishing a relationship between pAvg and Br for one of the RGB components. A series of source or reference data frames 50 with a gradually increasing amount of the frame covered by an object as shown is generated. Each of the source data frames 50 is sectioned and distributed via a mapping algorithm to form a set of pre-distort images as in the prior art. The pre-distort images are compressed to form a set of holographic elements 52, each of which is sequentially recorded onto a holographic recording medium to form a holographic stereogram 54, in the prior art manner. For clarity, an uncompressed form of the holographic elements 52 is illustrated in FIG. 5.

A charge-coupled device (CCD) or a spectrometer is placed at a plurality of viewing positions 56 relative to the holographic stereogram 54 and measures the brightness, Br, of a series of images 58 corresponding to the source data frames 50, reproduced from the holographic stereogram 54.

For the same frames that were used to create the holographic stereogram 54, values of pAvg are determined.

In this example there are ten different frames and ten hologels. The ten frames yield ten different shades of the single colour (e.g. green) other than the object in the final hologels, resulting from ten different pAvg values in the pre-distort images (which images are all the same). These different shades appear in ten different layers. By determining the brightness values for the holographic stereogram at positions corresponding to the 10 different layers, it is possible to plot a curve linking Br to pAvg.

Each pre-distort image has n rows of pixels and i columns of pixels. The averaged pixel values, pAvg, of the pixels 62 in each row n of pixels in the pre-distort image 64 are calculated, using the following equation, Equation (2):

$$pAvg_n = \frac{\left(\sum_{i=1}^{\text{num\_horiz\_pix}} palette_{n,i}\right)}{\text{num\_horiz\_pix}} \quad (2)$$

where num_horiz_pix represents the total number of pixels across the compression axis and $pAvg_n$ represents the pixel value averaged across the compression axis in a row of pixels n.

For a colour stereogram, pAvg for each RGB component is calculated separately.

Each pixel 62 of a pre-distort image 64 has a minimum pixel value of 0 when black and a maximum value of 255 for the particular primary colour (e.g. green). pAvg is calculated by summing the pixel values of all the pixels 62 across the compression axis and dividing the sum obtained by the total number of pixels across the compression axis. Although depicted in a horizontal parallax system, it will be appreciated that the invention can also be employed in a vertical or a full parallax system, the full parallax system being described later.

Figure 6:
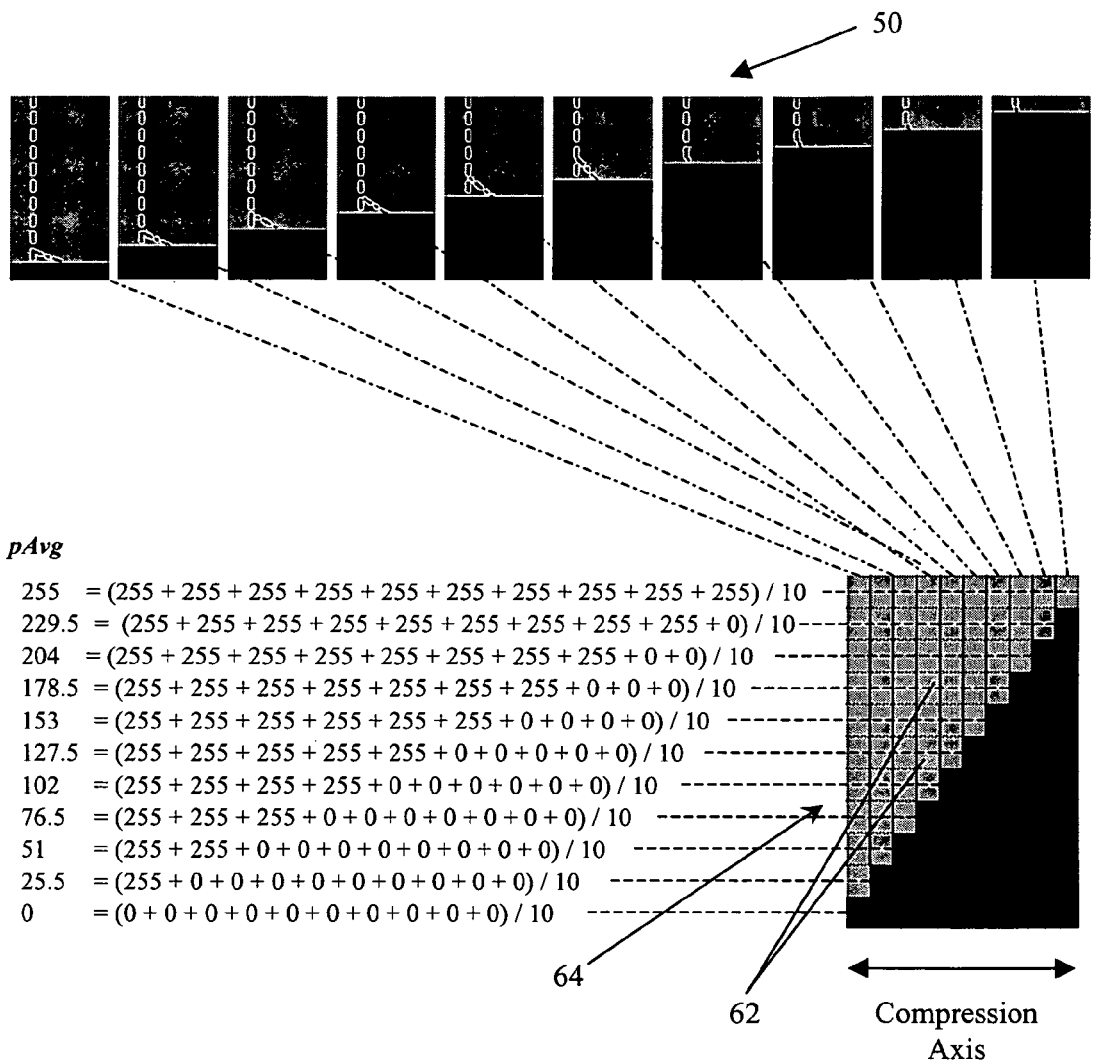
FIG. 6 illustrates the calculation of pAvg for the pixels in a pre-distort image.

In FIG. 6, although there may be hundreds of pixels in each of the horizontal and vertical directions, the fact that there are only ten frames mean that the pre-distort image can be divided into ten different strips across the compression axis. Within each strip, for any one row, the values of the pixels are all the same. Further, because of the nature of these particular source data frames, the pre-distort image can be viewed as having eleven different layers. Within each layer, for any one column of pixels, the values of the pixels are all the same and within each layer, the rows of pixels are the same. Because there are only eleven such layers and they are all different, this gives rise to eleven different pAvg values, as indicated below in Table 1. Table 1 is for one colour channel only, assuming monochromatic images, which in this example are green. Where there is more than one colour, there would be similar calculations for each colour each different view of the image 58 and the averaged pixel values, pAvg, of the corresponding pixel layer in the pre-distort images form a point on the graph of Br against pAvg. The set of points is used for plotting a graph of Br against pAvg. Rows (and layers) with pAvg of zero are ignored. Thus the left-hand most view 58 of the holographic stereogram 54 corresponds to the tenth layer of the pre-distort image 64 (that is the first non-zero layer). The pre-distort images 52 are implicit representations of the original images 50. When the eye is at the left-hand most view 58, it is seeing the 'left-most' column of each of the holographic elements 52. The 'assembly' of all these columns that the eye sees, add up to reproduce the view in the left-hand most view 58. The right-hand most view 58 of the holographic stereogram 54 corresponds to the first layer of the pre-distort image 64. When the eye is at the right-hand most view 58, it is seeing the 'right-most' column of each of the holographic elements 52. The 'assembly' of all these columns that the eye sees, adds up to reproduce the view in the right-hand most view 58.

A best fit $n^{th}$-order polynomial (e.g. a $5^{th}$ or $6^{th}$-order polynomial function to represent the curve as accurately as possible) is drawn for the various points (ten in this case), for instance as is shown later [in FIG. 8(*a*)], showing the relationship between pAvg and Br.

For FIGS. 5 and 6, we have assumed single colour usage. However, typically there will be various colours. Therefore such measurements and graphs are determined for reference images for each of red, green and blue on the recording material.

In FIG. 5, the viewing angle covering all the views is around 90°. With ten frames, each step 60 of 9° in viewing position 56 yields a different image. Where an interval 60 between consecutive viewing position 56 is judged to be too narrow to obtain a substantially differentiable measurement of Br (which may even be the case for an interval of 9°), a slightly different method for establishing Br can be used, as is illustrated in FIG. 7.

Figure 7:
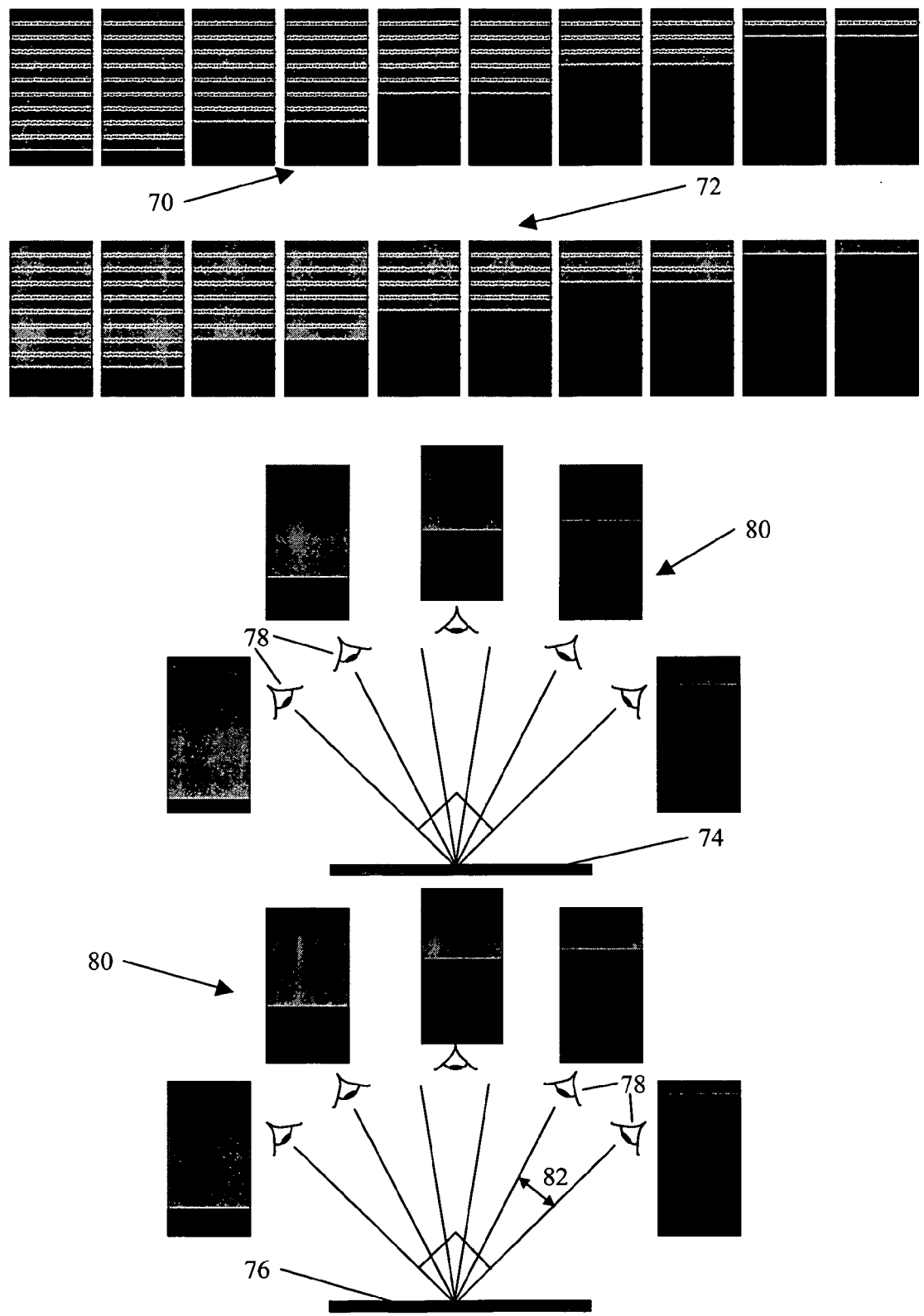
FIG. 7 illustrates a method for establishing a relationship between pAvg and Br.

In FIG. 7, first and a second series of source or reference data frames 70, 72 with colour gradations are generated. In substance, the first and the second series of source data frames 70, 72 in FIG. 7 are made up of the same source data frames as in FIG. 5. However, the first series 70 is made up of

TABLE 1

| Layer | Calculation | pAvg |
|---|---|---|
| First (Top) | (255 + 255 + 255 + 255 + 255 + 255 + 255 + 255 + 255 + 255)/10 | 255 |
| Second | (255 + 255 + 255 + 255 + 255 + 255 + 255 + 255 + 255 + 0)/10 | 229.5 |
| Third | (255 + 255 + 255 + 255 + 255 + 255 + 255 + 255 + 0 + 0)/10 | 204 |
| Fourth | (255 + 255 + 255 + 255 + 255 + 255 + 255 + 0 + 0 + 0)/10 | 178.5 |
| Fifth | (255 + 255 + 255 + 255 + 255 + 255 + 0 + 0 + 0 + 0)/10 | 153 |
| Sixth | (255 + 255 + 255 + 255 + 255 + 0 + 0 + 0 + 0 + 0)/10 | 127.5 |
| Seventh | (255 + 255 + 255 + 255 + 0 + 0 + 0 + 0 + 0 + 0)/10 | 102 |
| Eighth | (255 + 255 + 255 + 0 + 0 + 0 + 0 + 0 + 0 + 0)/10 | 76.5 |
| Ninth | (255 + 255 + 0 + 0 + 0 + 0 + 0 + 0 + 0 + 0)/10 | 51 |
| Tenth | (255 + 0 + 0 + 0 + 0 + 0 + 0 + 0 + 0 + 0)/10 | 25.5 |
| Eleventh (Bottom) | (0 + 0 + 0 + 0 + 0 + 0 + 0 + 0 + 0 + 0)/10 | 0 |

For simplicity, only one value is shown for each strip for each layer, rather than calculating for each row.

The brightness, Br, of the pixels in the images 58, obtained as described above with reference to FIG. 5, and the averaged pixel values, pAvg, of the corresponding pixels 62 in the pre-distort image 64, obtained as described above with reference to FIG. 6, provide a set of points. The brightness, Br, of alternate frames from the series 50 in FIG. 5, with each frame in the first series 70 repeated once (i.e. appearing twice). Likewise, the second series 72 is made up of the remaining alternate frames from the series 50 in FIG. 5, with each frame in the second series 72 also repeated once, as shown in FIG. 7. The first and the second series of source data frames 70, 72 are sectioned and distributed via a mapping algorithm to form a first and a second set of pre-distort images. The first and the second set of pre-distort images are respectively compressed into a first and a second set of holographic elements which are sequentially recorded onto a first and a second holographic recording medium to form a first and a second holographic stereogram 74, 76. For each stereogram 74, 76, a charge-coupled device (CCD) or a spectrometer is placed at a plurality of viewing positions 78 and measures the brightness, Br, of a series of images 80 of the source data frames 70, 72 reproduced with the first and the second holographic stereograms 74, 76.

The brightness, Br, of the pixels in the images 80 and the averaged pixel values, pAvg, of corresponding pixels in two corresponding pre-distort images provide a set of points for plotting the graph of Br against pAvg and drawing a curve.

If the interval 82 between each consecutive viewing position 78 is still too narrow to obtain a substantially differentiable measurement of Br, the method illustrated in FIG. 7 may be repeated with a greater number of repetitions of the source data frames 50 in FIG. 5 and the generation of a corresponding number of series of source data frames until the interval between each consecutive viewing position is large enough to obtain a substantially differentiable measurement of Br.

Figure 8A:
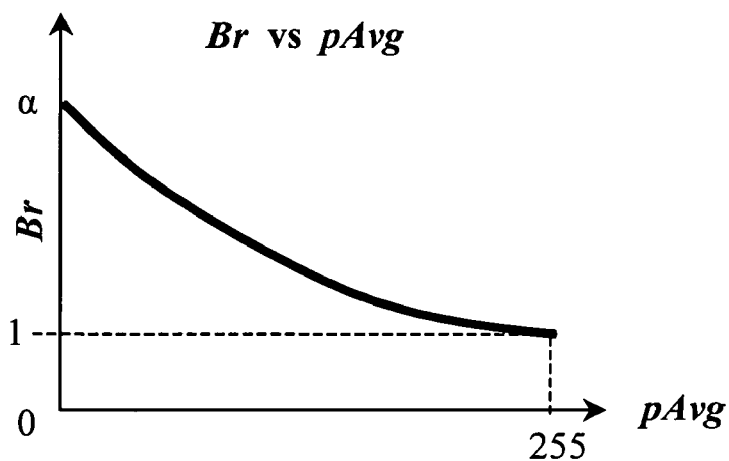
FIG. 8(a) illustrates a graph of Br against pAvg.

FIG. 8(a) shows a relationship between Br and pAvg generated from reference images for one colour component for one recording material. The units for the Br are arbitrary or irrelevant, as long as all values are measured the same way. When drawing the curve, the Br corresponding to the first layer (which has the lowest Br value and the highest pAvg) is given a value of 1.0 (so that when pre-distort images are being compensated the atten for other rows/layers having the same pAvg is 1, i.e. such rows/layers are not made darker), and the other Br values plotted accordingly, by shifting them the same amount as the Br corresponding to the first layer was shifted to be given a value of 1.0.

In an alternative embodiment, pAvg may be expressed as a percentage, $pAvg_{ratio}$, with the following equation, Equation (3):

$$pAvg_{ratio} = (pAvg/palette_{Max}) \times 100\%  \quad (3),$$

where $palette_{Max}$ represents a maximum pixel value based on the colour mode being used, in this example it is 255.

Figure 8B:
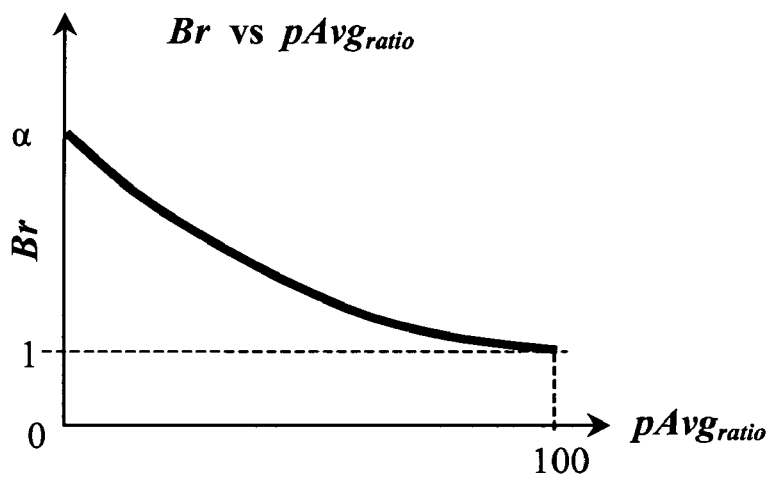
FIG. 8(b) illustrates a graph of Br against $pAvg_{ratio}$.

Accordingly, a set of points of Br against $pAvg_{ratio}$ can be plotted and a line drawn as illustrated in FIG. 8(b), showing the relationship between $pAvg_{ratio}$ and Br for one of the RGB components. Again the minimum value for Br is set as 1.0.

As discussed previously, the ghosting phenomenon reduces the degree of saturation of the pixels in the holographic elements forming the holographic stereogram. Consequently, the attenuation factor, atten, is inversely proportional to the brightness of a pixel in an image reproduced from an uncompensated holographic stereogram, Br. In this embodiment, the attenuation factor, atten, derived is the inverse of the brightness, Br:

$$atten = 1/Br \quad (4).$$

Figure 8C:
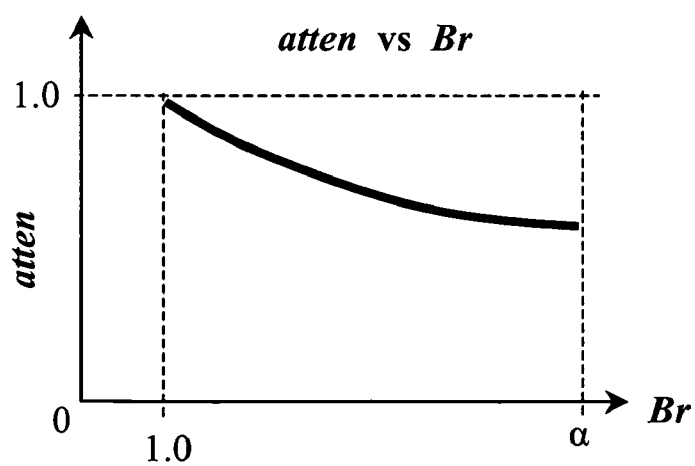
FIG. 8(c) illustrates a graph of atten against Br.

This relationship is shown in FIG. 8(c).

Once the relationship between Br and pAvg or between $pAvg_{ratio}$ and Br has been determined from reference images, measurements of pAvg from an actual image to be converted into a holographic stereogram can be used to read off the corresponding Br values, to allow correct compensation to be made.

Figure 9:
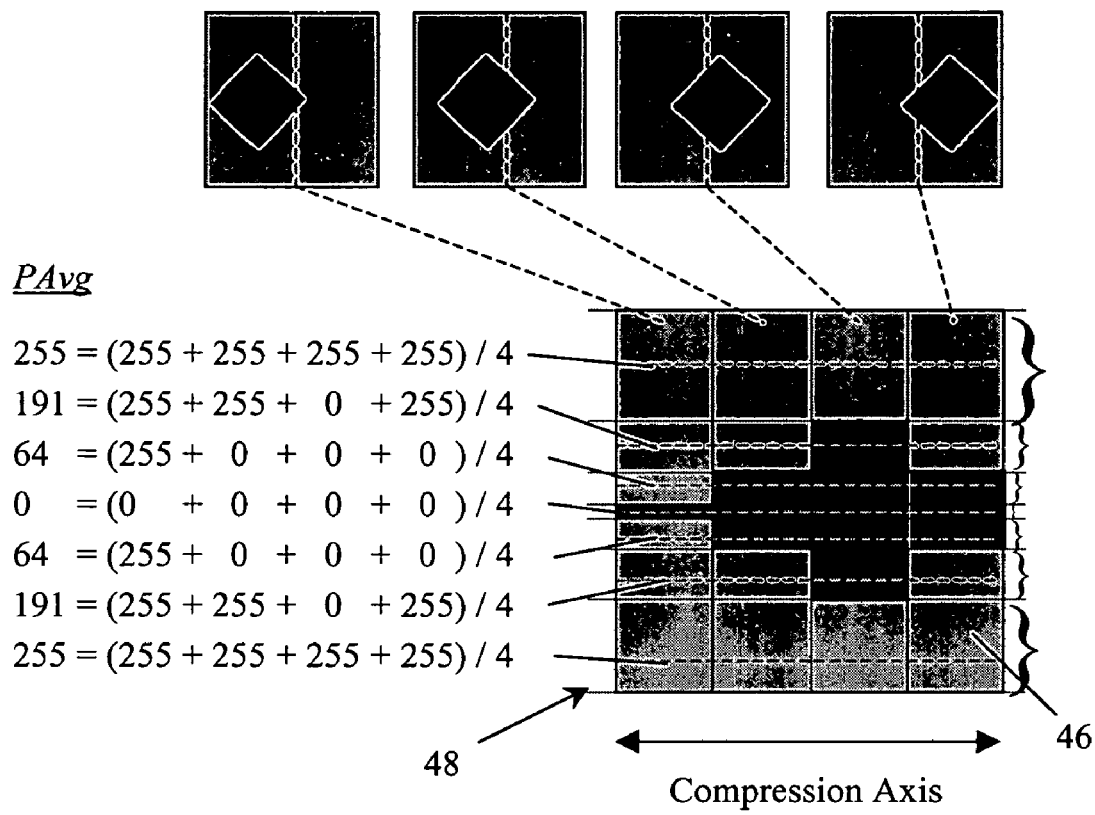
FIG. 9 illustrates a calculation of pAvg for pixels in a pre-distort image.

FIG. 9 illustrates a calculation of pAvg for a pre-distort image 48 derived from the source data frames being reduced to a holographic stereogram. Each pixel 46 of a pre-distort image 48 has a minimum pixel value of 0 when black and a maximum value of 255. pAvg is calculated, as indicated in Equation (2), by summing the pixel values of all the pixels across the compression axis and dividing the sum obtained by the total number of pixels across the compression axis (i.e. the image width, in pixels, of the pre-distort image).

pAvg should be determined for all pixel rows. Thus if the image's height were 480 pixels, then we would theoretically need to calculate the pAvg for all 480 pixels rows. However, for the sake of simplicity, only seven measurements are shown, calculated using four pixel values each as there are only four frames. The regions with uniform pAvg values are shown with a bracket beside them in FIG. 9.

Although depicted in a horizontal parallax system, it will be appreciated that the invention can also be employed in a vertical or a full parallax system, the latter of which is described later. In a vertical parallax system, the various processes applied in the horizontal and vertical directions in the described process are conducted in the vertical and horizontal directions, respectively.

In FIG. 9, there are four frames and seven distinguishable layers 46 in the pre-distort image 48. These give rise to seven potentially different pAvg values, although only four different pAvg values in practice, as indicated below in Table 2.

TABLE 2

| Pixel Layer | Calculation (for one colour channel) | pAvg |
| --- | --- | --- |
| First (Top) | (255 + 255 + 255 + 255)/4 | 255 |
| Second | (255 + 255 + 0 + 255)/4 | 191.25 |
| Third | (255 + 0 + 0 + 0)/4 | 63.75 |
| Fourth | (0 + 0 + 0 + 0)/4 | 0 |
| Fifth | (255 + 0 + 0 + 0)/4 | 63.75 |
| Sixth | (255 + 255 + 0 + 255)/4 | 191.25 |
| Seventh | (255 + 255 + 255 + 255)/4 | 255 |

For any pixel layer in a pre-distort image, a pAvg can be measured. For each pAvg, a predicted value of Br may be obtained from the graph of Br against pAvg illustrated in FIG. 8(a) [or using $pAvg_{ratio}$ from the graph of Br against $pAvg_{ratio}$ illustrated in FIG. 8(b)]. The predicted values of Br may be substituted into Equation (4) to calculate the attenuation factor, atten, for each pixel in the pre-distort images. Alternatively, Equation (4) may be expressed graphically as illustrated in FIG. 8(c) for the range of Br values plotted in the graphs of FIGS. 8(a) and 8(b). The attenuation factor, atten, for a predicted image brightness, Br, may be read from the graph of atten against Br illustrated in FIG. 8(c). As a further alternative, a single graph of pAvg against atten (or $pAvg_{ratio}$ against atten), may be plotted.

With the graphs in FIGS. 8(a) to 8(c) and Equation (1)

$$palette_{New} = palette \times atten \quad (1)$$

and Equation (4), the compensated pixel value for a pixel of a pre-distort image in a monochromatic system, where two of the three colour components of a pixel have a 0 value, $palette_{New}$, can be determined using any one of the following equations, Equations (5), (6) and (7):

$$palette_{New} = palette \times (1/Br) \quad (5),$$

$$palette_{New} = palette \times \{1/[f(pAvg_{ratio}) + 1]\} \quad (6),$$

$$palette_{New} = palette \times \{1/[f(pAvg) + 1]\} \quad (7)$$

Coloured System

In a coloured system, where the holographic stereogram comprises more than one of the three RGB components, the predicted brightness, Br, of a single RGB component is affected by the pixel values of the other RGB components. Because the pixel value of a pixel is not directly proportional to the sum of the pixel values of each of the three RGB components, the embodiments for a coloured system use a weighting factor, $Weight_X$, to compensate for the effect of the pixel values of the other RGB components on the pixel value of the single RGB component. Accordingly, Br may be expressed by the following equation, Equation (8):

$$Br_{X(colour)} = (Br_{X(mono)}/Weight_X) \quad (8)$$

where $Br_{X(colour)}$ represents the brightness of a component X (one of the RGB components) of a pixel in a coloured system, $Br_{X(mono)}$ represents the brightness of an X component of a pixel in a monochromatic system, and $Weight_X$ represents the effect of the other two RGB components Y and Z on $Br_{X(mono)}$.

$Weight_X$ is a function of the averaged pixel value of each of the two other RGB components of a pixel in a pre-distort image, $pAvg_{ratio,Y}$ and $pAvg_{ratio,Z}$:

$$Weight_X = f(pAvg_{ratio,Y}, pAvg_{ratio,Z}) \quad (9),$$

that is:

$$Weight_G = f(pAvg_{ratio,R}, pAvg_{ratio,B}) \quad (10)$$

$$Weight_R = f(pAvg_{ratio,G}, pAvg_{ratio,B}) \quad (11)$$

$$Weight_B = f(pAvg_{ratio,R}, pAvg_{ratio,G}) \quad (12).$$

Figure 10:
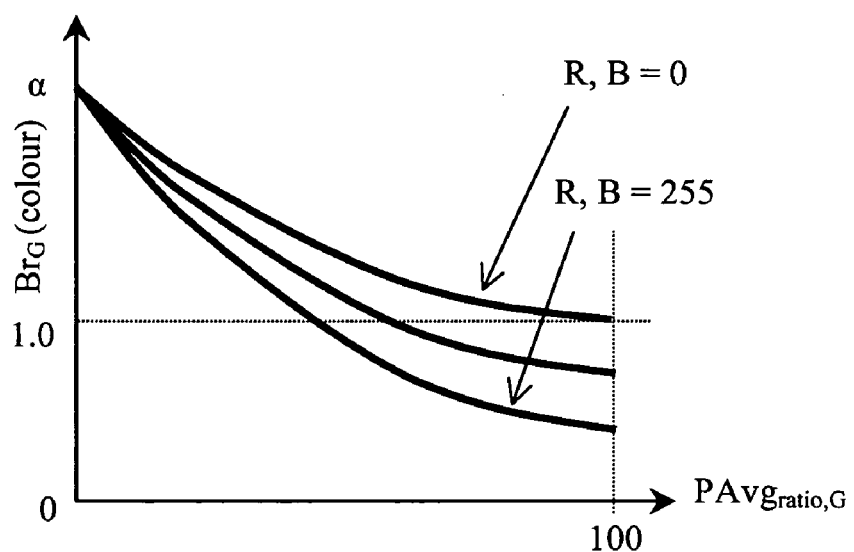
FIG. 10 illustrates three curves for $Br_G$ against $pAvg_{ratio,G}$ for different R, B values

In a similar fashion to that described above for the monochrome system, graphs of Br against $pAvg_{ratio}$ can be plotted and lines drawn for different combinations of colours, showing the relationship between $pAvg_{ratio}$ and Br for one of the RGB components for each combination. FIG. 10 illustrates three curves for $Br_G$ against $pAvg_{ratio,G}$. The top curve is for R, B=0, which is the same as the curve in FIG. 8(b). The middle curve represents intermediate values of R and B, where R and B are non-zero. The bottom curve is for R=255, B=255. From this set of curves, it can be determined that the weight curves for the different colours are, in fact, surface curves, as illustrated in FIGS. 11 (a), 11(b) and 11(c).

Figure 11A:
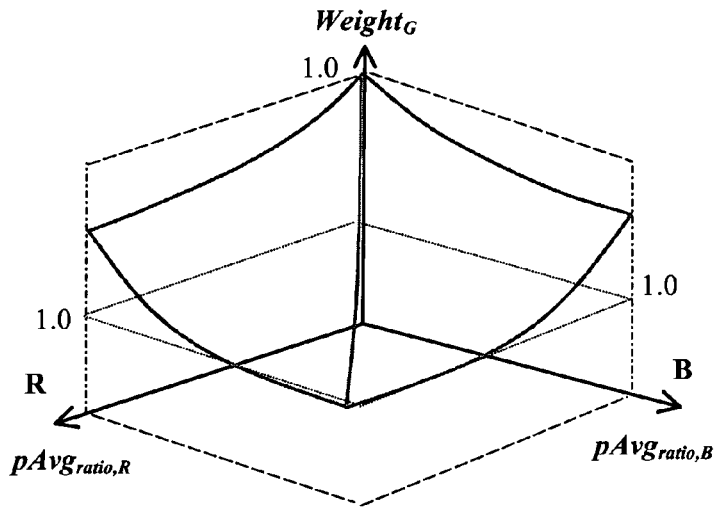
FIG. 11(a) is a graph illustrating a relationship between $Weight_G$, and $pAvg_{ratio,R}$ and $pAvg_{ratio,B}$.
Figure 11B:
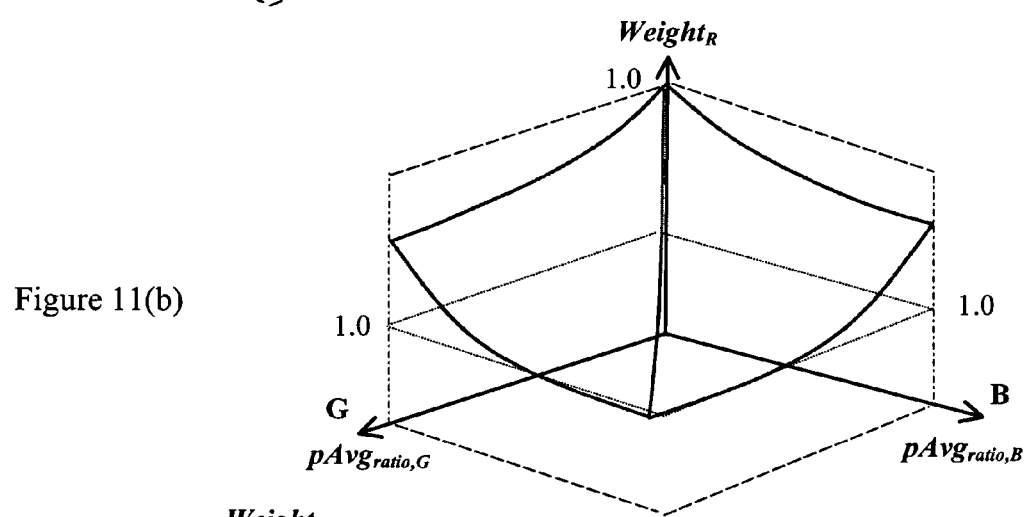
FIG. 11(b) is a graph illustrating a relationship between $Weight_R$, and $pAvg_{ratio,G}$ and $pAvg_{ratio,B}$.
Figure 11C:
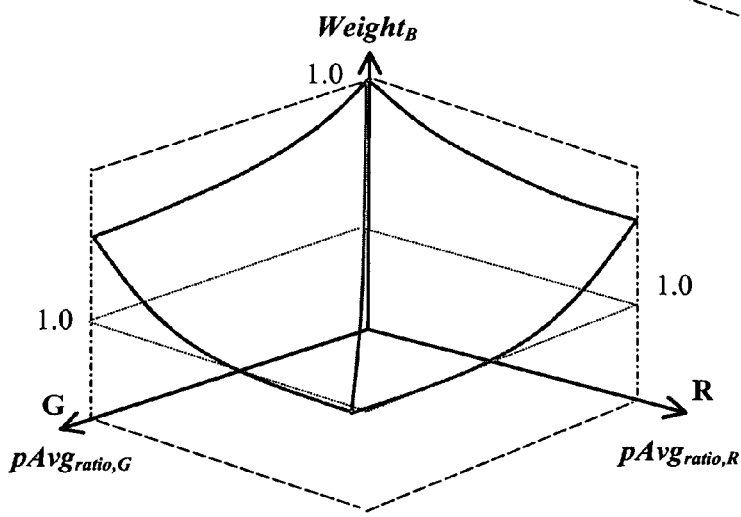
FIG. 11(c) is a graph illustrating a relationship between $Weight_B$, and $pAvg_{ratio,R}$ and $pAvg_{ratio,G}$.

Thus the relationship between $Weight_X$, and $pAvg_{ratio,Y}$ and $pAvg_{ratio,Z}$, may be expressed graphically as illustrated in FIGS. 11(a), 11(b) and 11(c). FIG. 11(a) is a graph illustrating the relationship between $Weight_G$, and $pAvg_{ratio,R}$ and $pAvg_{ratio,B}$. FIG. 11(b) is a graph illustrating the relationship between $Weight_R$, and $pAvg_{ratio,G}$ and $pAvg_{ratio,B}$. FIG. 11(c) is a graph illustrating the relationship between $Weight_B$, and $pAvg_{ratio,R}$ and $pAvg_{ratio,G}$.

A method for deriving the graph of FIG. 11(a) is described in the following paragraphs with reference to FIGS. 12(a), 12(b) and 13 in accordance with one embodiment of the present invention.

Figure 12A:
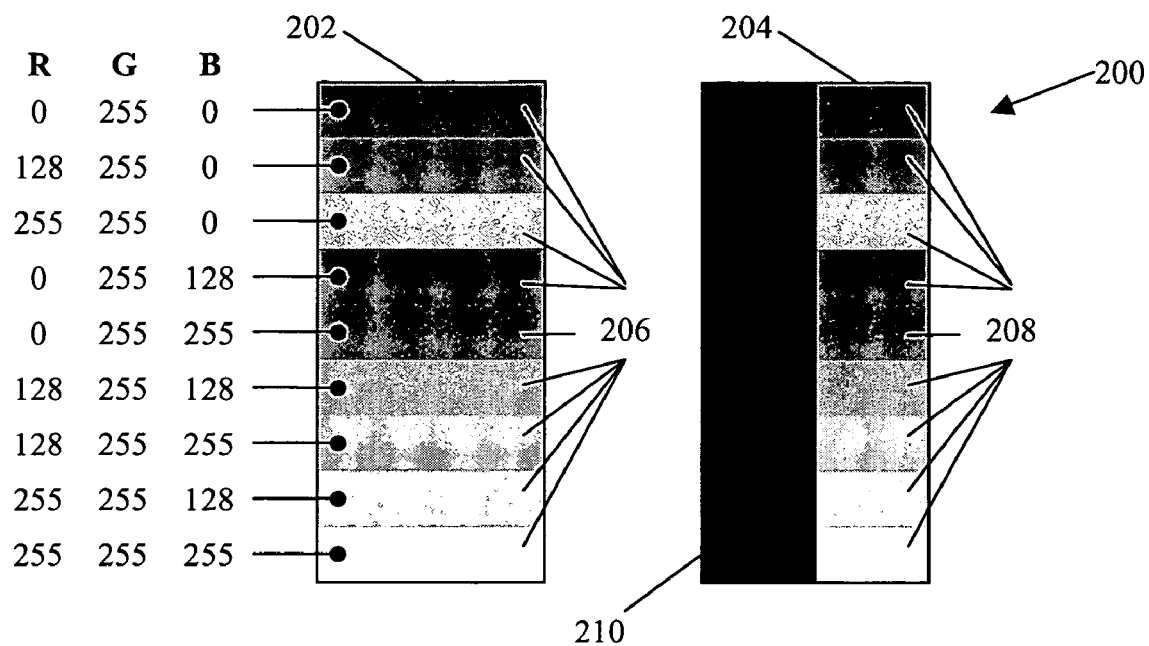
FIG. 12(a) illustrates a set of source data frames.
Figure 12B:
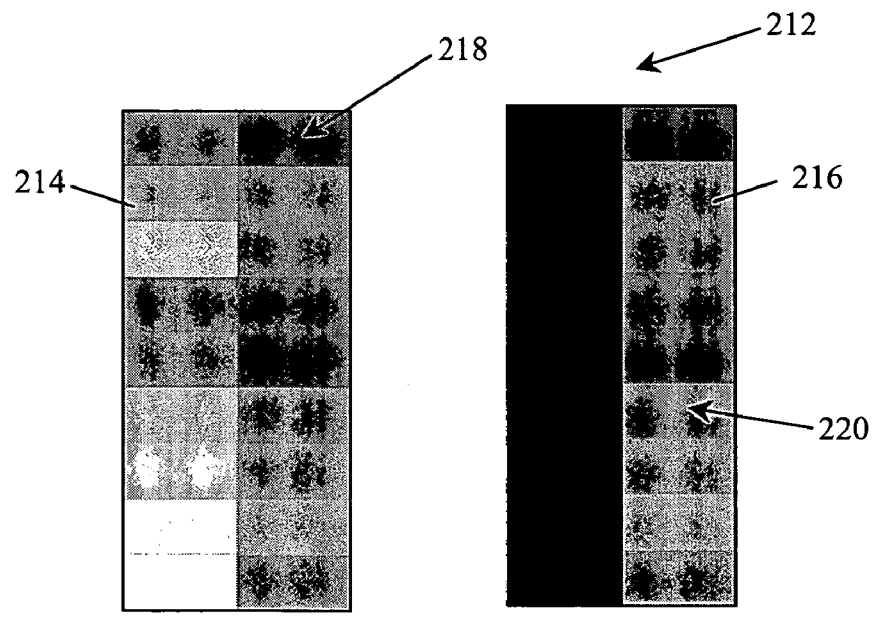
FIG. 12(b) illustrates a set of images of the set of source data frames reproduced from a holographic stereogram generated from the source data frames of FIG. 12(a)

The method comprises generating a set of source data frames 200 as shown in FIG. 12(a), resulting in a sets of images 212 as shown in FIG. 12(b).

The set of source data frames 200 comprises a first source data frame 202 and a second source data frame 204. The first source data frame 202 comprises a first set of sections 206, each section 206 having a different combination of RGB components and consequently, a different colour. Table 3 illustrates the pixel values of each RGB component for each section 206 of the first source data frame 202.

TABLE 3

| R | G | B |
|---|---|---|
| 0 | 255 | 0 |
| 128 | 255 | 0 |
| 255 | 255 | 0 |
| 0 | 255 | 128 |
| 0 | 255 | 255 |
| 128 | 255 | 128 |
| 128 | 255 | 255 |
| 255 | 255 | 128 |
| 255 | 255 | 255 |

The pixel value of the green component in the first source data frame 202 is kept constant, in this embodiment at the maximum pixel value, to determine the effect of the presence of the blue and/or red components on $Br_G$. Different colours for each section 206 are obtained by varying the pixel values of the blue and red components for each section 206. The effect of the presence of the blue and/or red components on $Br_G$ is more apparent when the pixel value of the green component is kept constant at the maximum pixel value.

On one side, the second source data frame 204 comprises a second set of sections 208 having the same colours as the first set of sections 206. However, on the other side, the pixel value of each of the RGB components on a portion 210 of the second source data frame 204 is zero, forming an area of black on the second source data frame 204 on the right hand side of FIG. 12(a).

The set of source data frames 200 is printed onto a holographic recording medium to form a first holographic stereogram, as described earlier.

FIG. 12(b) illustrates a set of images 212 of the set of source data frames 200 reproduced from the first holographic stereogram. The set of images 212 comprises a first image 214 and a second image 216. The first image 214 is a reproduction of the first source data frame 202, while the second image 216 is a reproduction of the second source data frame 204. Saturation is observed in the right hand side portions 218, 220 of the first image 214 and the second image 216, respectively.

Figure 13:
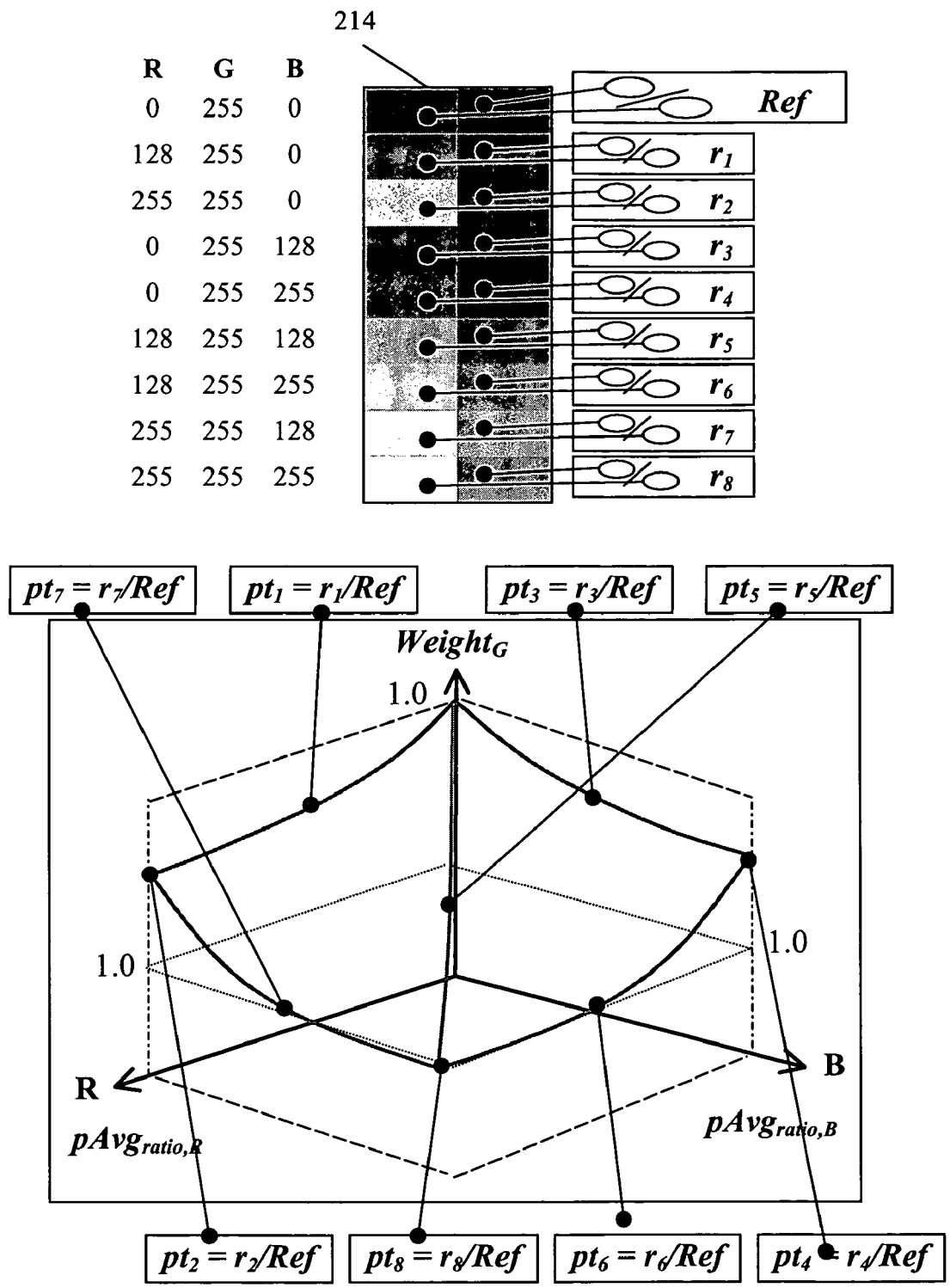
FIG. 13 illustrates the calculation of values from the images of FIG. 12(b) for plotting the graph of FIG. 11(a)

FIG. 13 illustrates the calculation of points from the image 214 of FIG. 12(b), for plotting of the graph of FIG. 11(a). The values from the image 214 can be measured using a CCD, for instance just a consumer CCD, with manual override function (e.g. the Sony Cybershot DSC-V1™ or equivalent). Manual override allows the user to fix capturing conditions, such as: 1) focus distance; 2) white balance; 3) f number; 4) aperture, etc.

Because all the calculations performed involve only the green component, software that can split the colours of the first image 214 into the pixel value of each of the three RGB components such as, for example, commercially available photo-editing suites (e.g. Photoshop™), is employed to determine the pixel value of the green component at various sections of the first image 214 and the third image 264.

For the first image 214, of FIG. 12(b), a reference ratio Ref is generated. The reference ratio Ref is the ratio of the pixel values of the saturated section to the non-saturated section for the non-saturated section containing only green, i.e. R=0, G=255, B=0 (the top layers in the first image 214).

Ratios $r_1, r_2, \ldots, r_8$ of the pixel values of the saturated sections to the non-saturated sections for each remaining section of the first image 214 are also generated.

Each of the ratios $r_1, r_2, \ldots, r_8$ is divided by the reference ratio Ref to obtain the co-ordinates along the $Weight_G$ axis for points $pt_1, pt_2, \ldots, pt_8$, respectively, for plotting the graph of FIG. 11(a).

Each of the points $pt_1$, $pt_2$, $pt_3$, $pt_4$, $pt_5$, $pt_6$, $Pt_7$, $pt_8$ is represented by a co-ordinate along the $Weight_G$ axis, a co-ordinate along the $pAvg_{ratio,R}$ axis and a co-ordinate along the $pAvg_{ratio,B}$ axis, that is ($Weight_G$, $pAvg_{ratio,R}$, $pAvg_{ratio,B}$), and are plotted as shown in FIG. 13. The co-ordinates for the $pAvg_{ratio,R}$ and $pAvg_{ratio,B}$ axes are obtained from the pixel values of the red and blue components, respectively, in individual lines of the sections 206 of the first source data frame 202.

The method for deriving the graph of FIG. 11(a) is repeated for the derivation of the graphs of FIGS. 11(b) and 11(c). For the graph of FIG. 11(b), the pixel value of the red component in the source data frames is kept constant and the points for the graph of FIG. 11(b) are calculated based on the pixel value of the red component in the reproduced images. For the graph of FIG. 11(c), the pixel value of the blue component in the source data frames is kept constant and the points for the graph of FIG. 11(c) are calculated based on the pixel value of the blue component in the reproduced images.

As is evident from the graphs, in the case where the pixel value of each of the other two components is 0, $Weight_X$ is a constant having the value 1, and $Br_{X(colour)}$ equals $Br_{X(mono)}$.

With the graphs in FIGS. 11(a) to 11(c), the compensated pixel value for each of the RGB components of a pixel of a pre-distort image in a coloured system, $palette_{New}$, can be calculated using any one of the following equations, Equations (13) to (21):

input into a SLM. The compensated pre-distort images are compressed 310 to form a plurality of holographic elements, each of which is sequentially recorded 312 onto a holographic recording medium to form the holographic stereogram.

Figure 15:
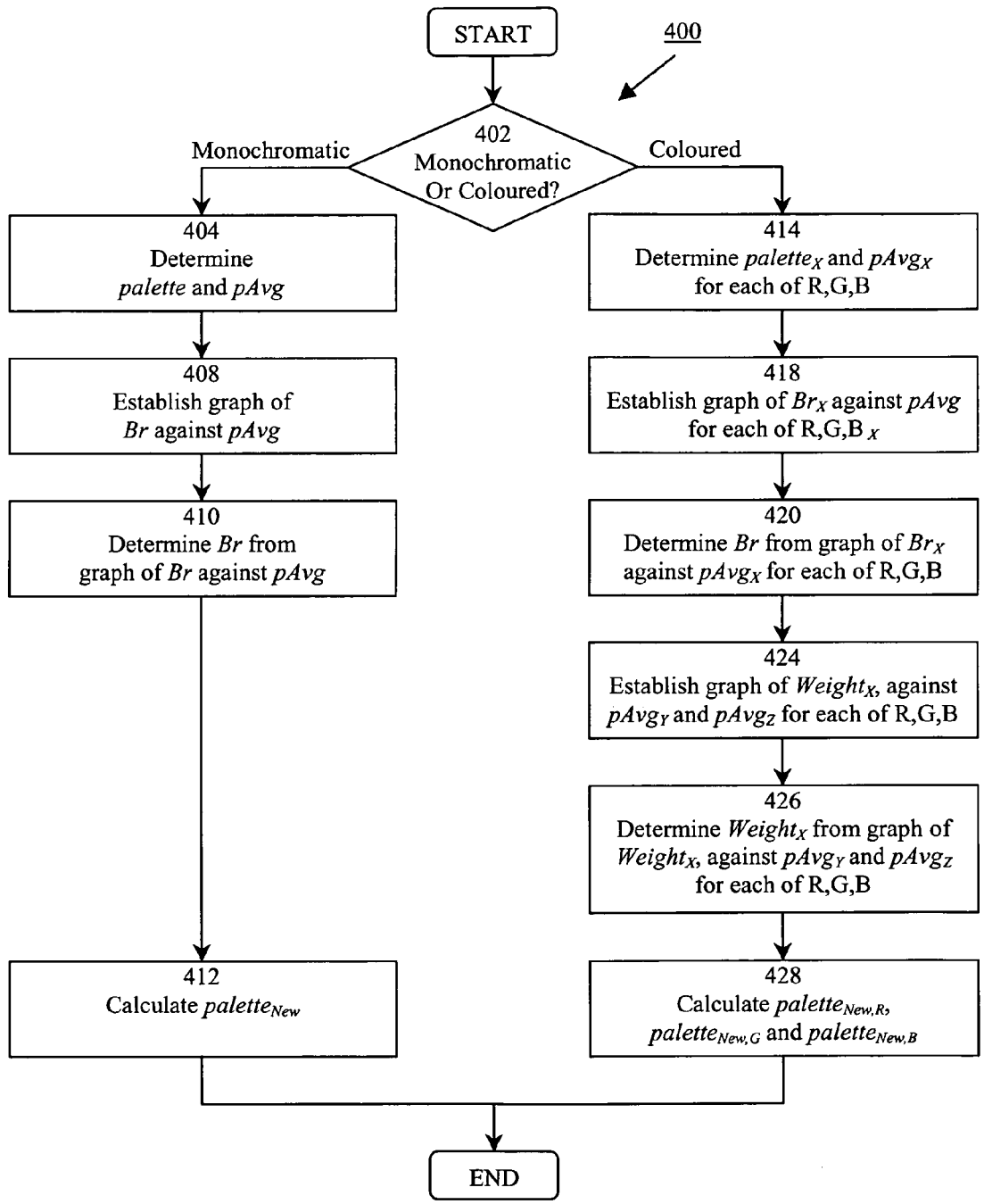
FIG. 15 is a flowchart illustrating a method for compensating a pre-distort image for variations in the degree of saturation.

The compensation 308 of each pre-distort image is described in greater detail in FIG. 15. In particular, FIG. 15 is a flowchart illustrating a method 400 for compensating a pre-distort image for variations in the degree of saturation in accordance with one embodiment of the present invention. The method 400 begins by determining 402 whether the pre-distort image is monochromatic or coloured.

In the case where it is determined 402 that the pre-distort image is monochromatic, the pixel value, palette, and the averaged pixel value, pAvg, for each pixel in the pre-distort image are determined 404.

A graph of the predicted brightness, Br, against the averaged pixel value, pAvg, is established 408, for instance according to the method described above with reference to FIGS. 5 to 9. Thereafter, the predicted brightness, Br, is determined 410 from the graph of the predicted brightness, Br, against the averaged pixel value, pAvg.

A compensated pixel value, $palette_{New}$, is then calculated 412 for each pixel in the pre-distort image using any one of Equations (5), (6) and (7).

In the case where it is determined 402 that the pre-distort image is coloured, the pixel value, $palette_X$, and the averaged $$palette_{New,G(colour)} = palette_G \times (1/Br_{G(colour)}) \qquad (13)$$

$$= palette_G \times \{1/([Br_{G(mono)}/Weight_G]+1)\} \qquad (14)$$

$$= palette_G \times \{1/([Br_{G(mono)}]/f(palette_R, palette_B)]+1)\} \qquad (15)$$

$$palette_{New,R(colour)} = palette_R \times (1/Br_{R(colour)}) \qquad (16)$$

$$= palette_R \times \{1/([Br_{R(mono)}/Weight_R]+1)\} \qquad (17)$$

$$= palette_R \times \{1/([Br_{R(mono)}]/f(palette_G, palette_B)]+1)\} \qquad (18)$$

$$palette_{New,B(colour)} = palette_B \times (1/Br_{B(colour)}) \qquad (19)$$

$$= palette_B \times \{1/([Br_{B(mono)}/Weight_B]+1)\} \qquad (20)$$

$$= palette_B \times \{1/([Br_{B(mono)}]/f(palette_R, palette_G)]+1)\} \qquad (21)$$

For example, the compensated pixel value for the green component of a pixel of a pre-distort image in a coloured system, $palette_{New,G(colour)}$, can be calculated using Equation (14) by determining the pixel value of the green component, $palette_G$, determining pAvg for the pixel and thereby $Br_{G(mono)}$ from FIG. 8(a) and determining $pAvg_{ratio,R}$ and $pAvg_{ratio,B}$ for the pixel and thereby $Weight_G$ from FIG. 11(a).

Figure 14:
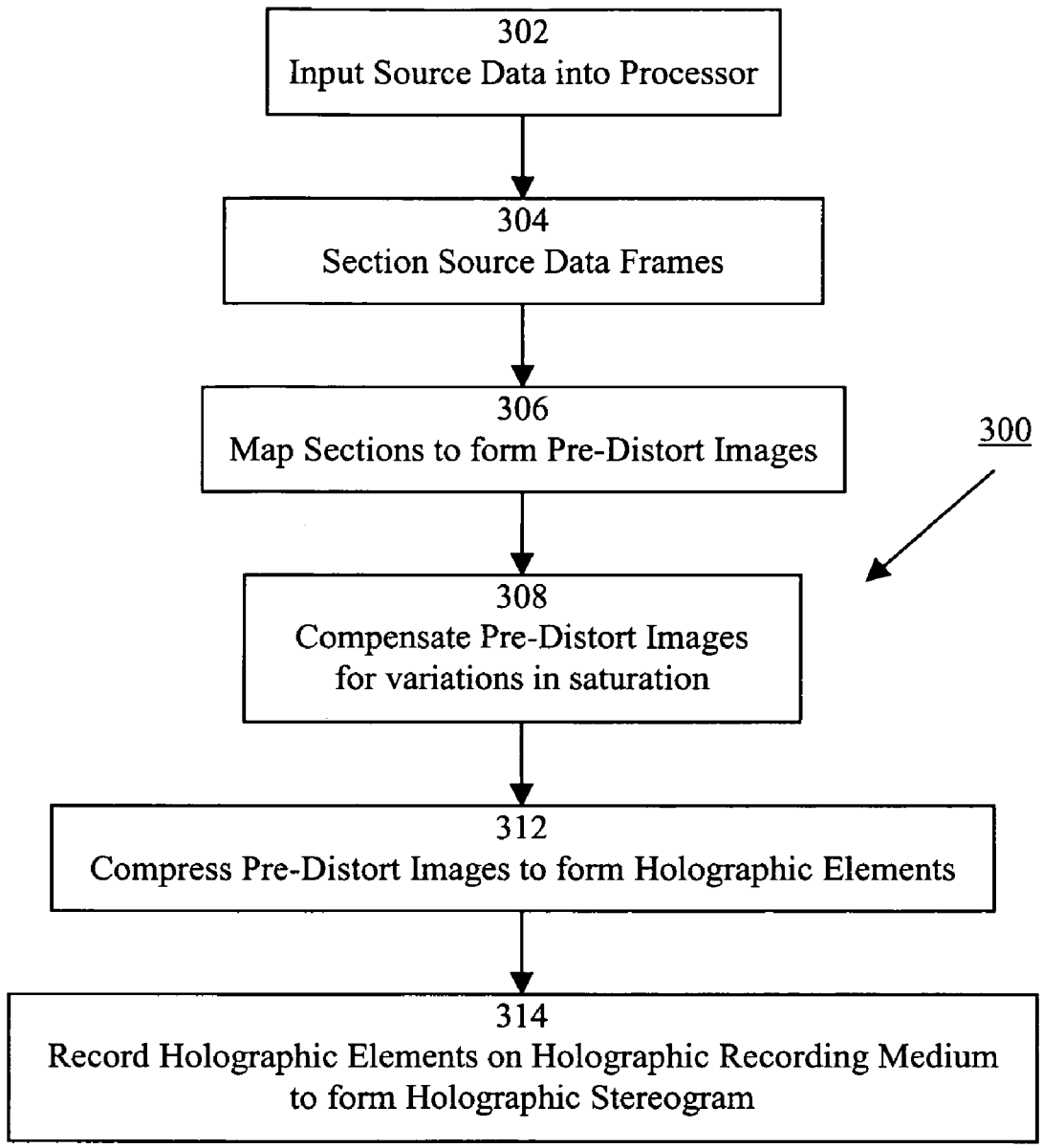
FIG. 14 is a flowchart illustrating a method for forming a holographic stereogram.

FIG. 14 is a flowchart illustrating a method 300 for forming a holographic stereogram in accordance with one embodiment of the present invention. The method 300 comprises inputting 302 source data comprising a plurality of source data frames containing two-dimensional views of a subject into a processor where the source data frames are sectioned 304. Each section of the source data frames is mapped 306 to form a plurality of pre-distort images. The pre-distort images are compensated 308 for variations in the degree of saturation to reduce the ghosting phenomenon by applying a compensation algorithm to a plurality of pixels in the pre-distort images. Thereafter, the compensated pre-distort images are pixel value, $pAvg_X$, for each RGB component of each pixel in the pre-distort image are determined 414.

A graph of the predicted brightness, $Br_X$, against the averaged pixel value, $pAvg_X$, for X=each of the R, G, and B components, is established 418, for instance according to the method described above with reference to FIGS. 5 to 9. Thereafter, the predicted brightness, $Br_X$, for X=each of the R, G, and B components, is determined 420 from the graph of the predicted brightness, $Br_X$, against the averaged pixel value, $pAvg_X$.

A graph of the weighting factor, $Weight_X$, against the averaged pixel values, $pAvg_Y$ and $pAvg_Z$, X=each of the R, G, and B components, is established 424, for instance according to the method described above with reference to FIGS. 11 to 13. Thereafter, the weighting factor, $Weight_X$, for X=each of the R, G and B components, is determined 426 from the graph of the weighting factor, $Weight_X$, against the averaged pixel values, $pAvg_Y$ and $pAvg_Z$.

Compensated pixel values, $palette_{New,R}$, $palette_{New,G}$ and $palette_{New,B}$, for each RGB component are then calculated 428 for each pixel in the pre-distort image using any one of Equations (13) to (15), (16) to (18), and (19) to (21), respectively.

The method 400 illustrated in FIG. 15 is repeated for each of the pre-distort images formed from the source data frames.

Full Parallax

The above described processes and embodiments are for horizontal parallax holographic stereograms, that is the holographic stereogram produces images in only a single plane. The invention is also applicable to full parallax holographic stereograms, which produce images in multiple planes.

The generation of full parallax holographic stereograms according to the invention uses many of the aspects used in horizontal parallax holographic stereograms as described above.

Figure 16:
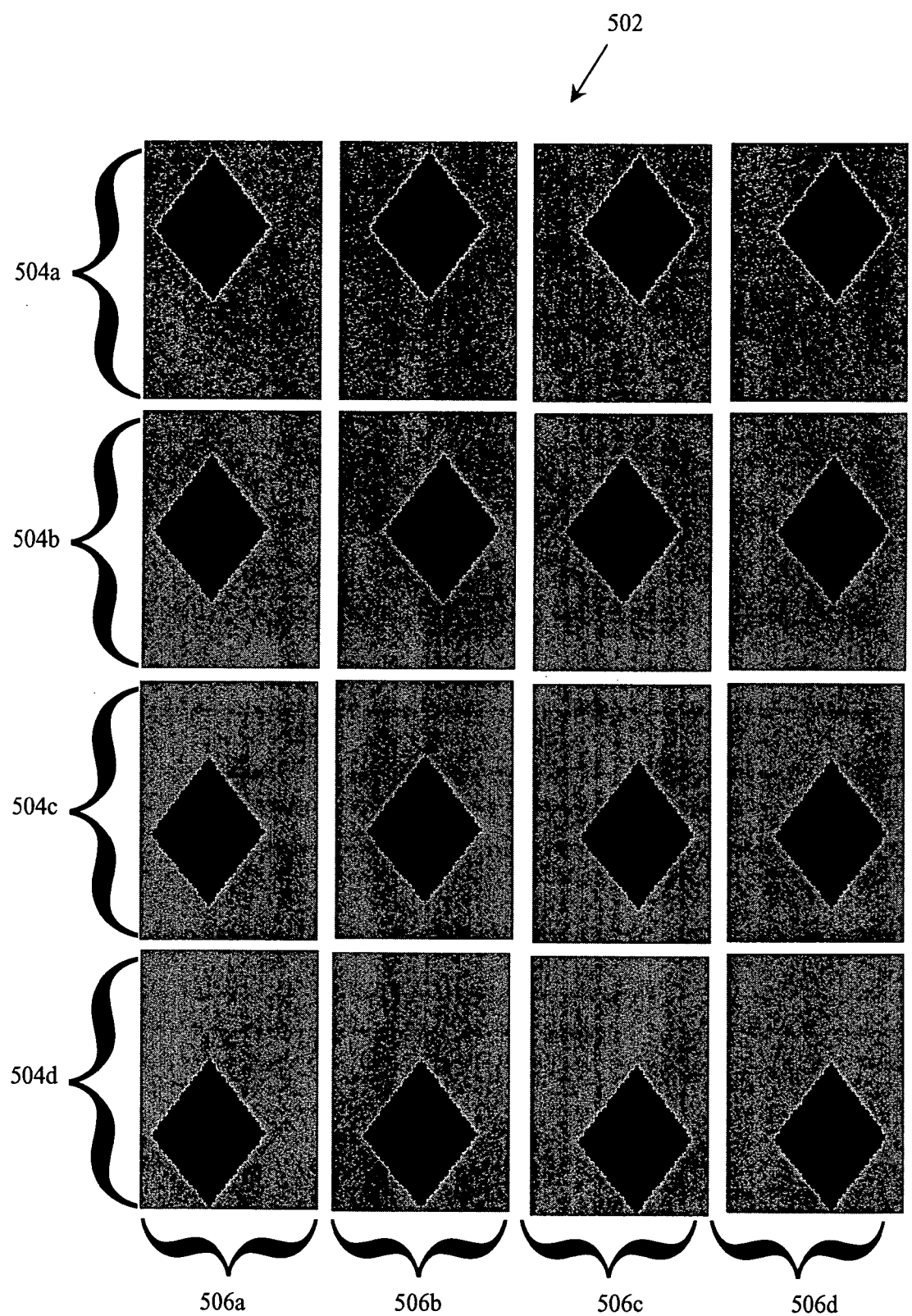
FIG. 16 is an example of a set of data source frames for use in generating a full parallax holographic stereogram.

A set of source data frames 502 for a full parallax holographic stereogram is shown in FIG. 16. The source data frames 502 contain multiple series of frames 504a, 504b, 504c, 504d, each series containing four frames 506a, 506b, 506c, 506d. As before there will usually be many more than just four frames in each series and many more than just four series. Further the numbers of frames per series and the number of series may differ).

Figure 17:
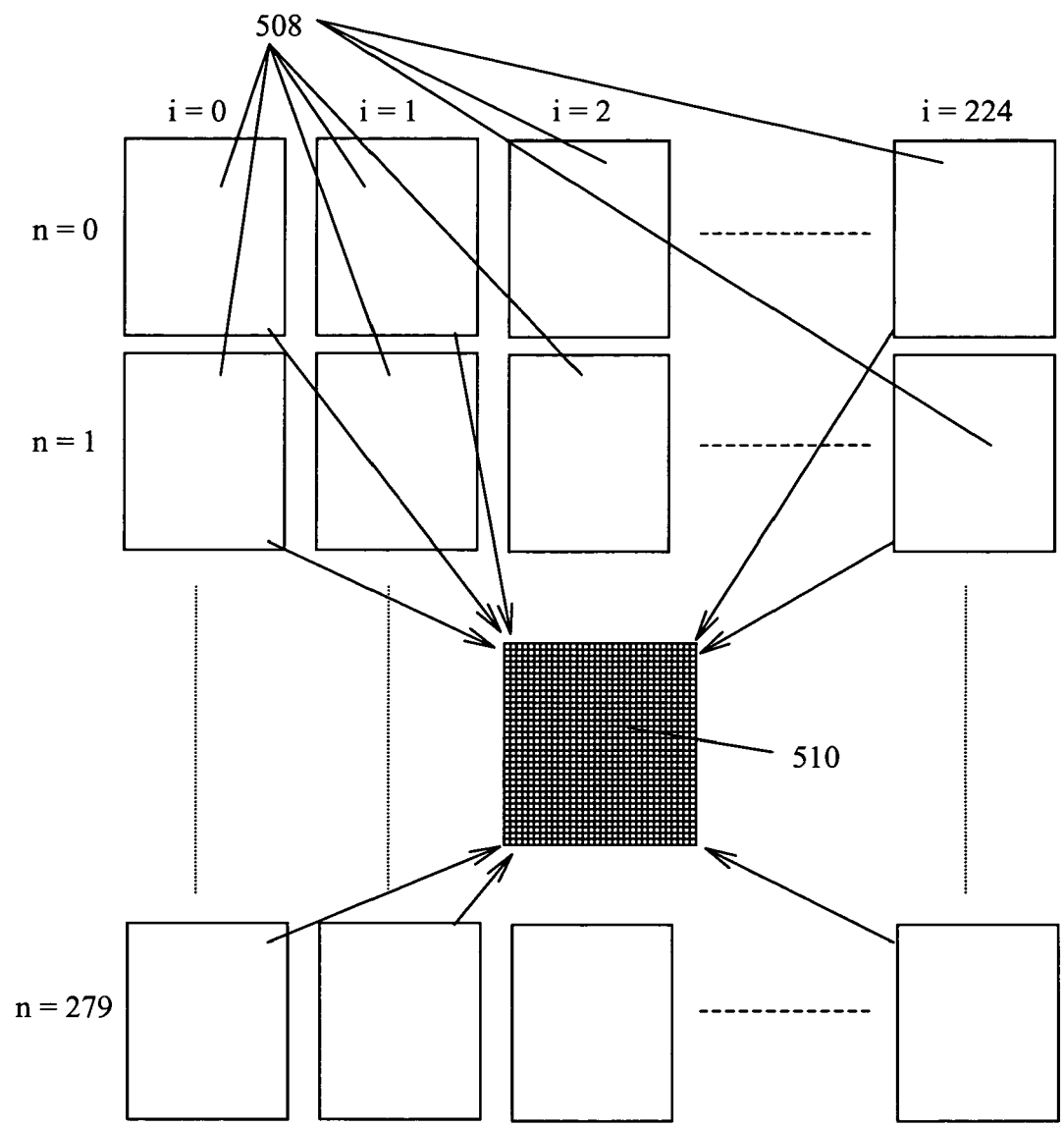
FIG. 17 is a schematic view of an array of pre-distort images and a hologel for use in generating a full parallax holographic stereogram.

Whereas a horizontal parallax holographic stereogram consists of hologels compressed along only one axis, a full parallax holographic stereogram consists of a series of hologels compressed along two axes, for instance as indicated in FIG. 17. A two-dimensional array of pre-distort images 508 is converted into hologels of a holographic stereogram 510. In this example the array is indicated as having 225 horizontal pre-distorts and 280 vertical pre-distorts, thus giving an array of 225×280 hologels that, together, form a holographic stereogram.

For generating monochrome full parallax holographic stereograms according to one embodiment, averaged pixel values from pre-distorts are still used. However, the averaging occurs in two dimensions rather than one. Thus Equation (2) above is replaced with Equation (2a), as follows:

$$pAvg_{n,i} = \frac{\left(\sum_{i=1}^{num\_horiz\_pix} palette_{n,i} + \sum_{n=1}^{num\_vert\_pix} palette_{n,i}\right)}{num\_horiz\_pix + num\_vert\_pix} \quad (2a)$$

where num_horiz_pix represents the total number of pixels in the horizontal direction, num_vert_pix represents the total number of pixels in the vertical direction, and $pAvg_{n,i}$ represents the average pixel value for pixel (n, i), being the sum of pixel values in row n and the sum of pixel values in the column i, the two sums added together and divided by the total of the number of pixels in the horizontal direction (number of columns) and the number of pixels in the vertical direction (number of rows).

Figure 18:
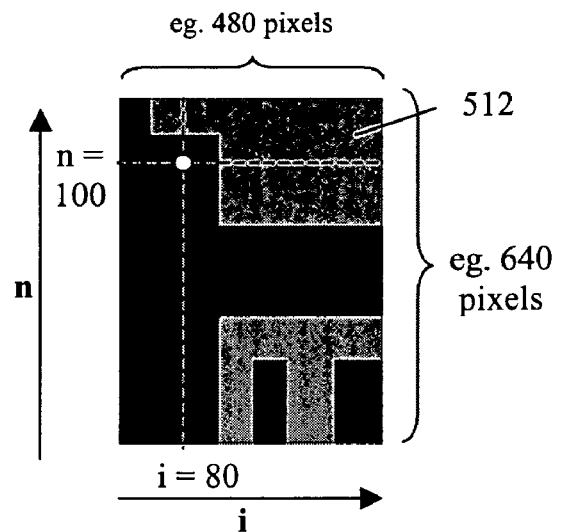
FIG. 18 illustrates an example of a full parallax pre-distort.

FIG. 18 illustrates an example of a full parallax pre-distort 512, in this case it is 480 pixels across and 640 pixels high. For an arbitrary pixel n=100, i=80, the pAvg is:

$pAvg_{100, 80}$=[(0+0+0 . . . +255+255)+(255+ 255 . . . +0+0)]/(480+640)

(calculating only for one colour, in this example the green channel).

Figure 19:
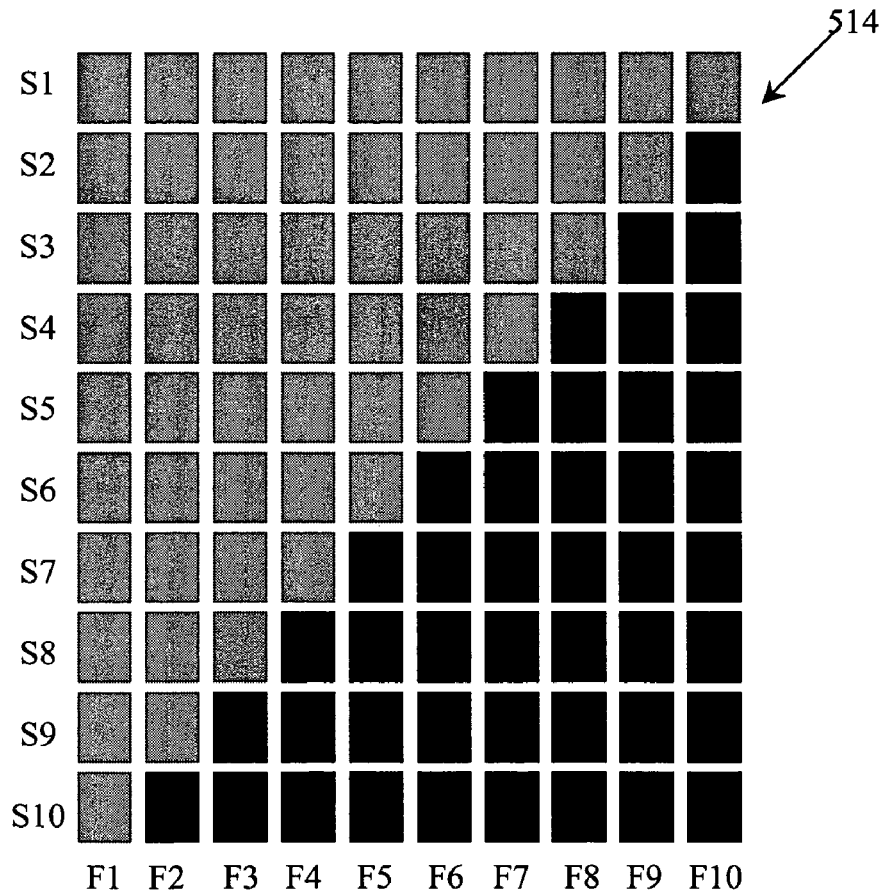
FIG. 19 illustrates a first set of reference data frames for use in generating a full parallax holographic stereogram.

A different set of reference data frames is used to generate the pAvg vs. Br relationship, from those used for the horizontal parallax approach. FIG. 19 shows an example of a suitable set of reference data frames 514 for the full parallax scheme. This set of reference data frames 514 has 10 series (S1-S10) of 10 frames (F1-F10) each. Slightly over half the reference data frames are monochromatic (i.e. just green or just red or just blue and no black), and the rest are black. In the first series S1 there are no black frames. In the second series S2 only the last frame is black. In the third series, the last two frames are black. This progression goes on to the last series S10, where all but the first frame is black.

FIG. 20(a) illustrates a pre-distort image 516 generated from the set of reference data frames 514 of FIG. 19. All the pre-distorts are the same. FIG. 20(b) illustrates an uncompensated hologel 516 generated from the pre-distort images 516. All the hologels are also the same. Physically reproduced, 516 becomes the "inaccurate" 518.

In a full parallax print 520, the holographic stereogram yields images as the eye position 522 changes along a viewing plane 524, for instance the axes x, y in FIG. 21. Looking in the viewing plane 524, at different positions along a diagonal line 526, one obtains different images 526, as in FIG. 22. The diagonal line is that extending from the top left corner of the print, as that is the only portion containing non-black areas. The brightness of each different image 526 is measured to give a Br value for that image. In this case, each specific viewing position along the line also corresponds to a specific pixel along a diagonal of a pre-distort image 516 (it does not matter which pre-distort image 516, as they are all the same). The pAvg value for each such pixel is determined, generating a set of points which can be plotted and joined together in a curve, as before. All pre-distorts form the image that the eye sees AND from which measurements are taken. Therefore, measurements along only the diagonal line of the actual stereogram print are sufficient. For example, in this case, if 3 points along the diagonal line are measured, 3 images of different brightness as is represented by 528 are obtained.

Figure 23:
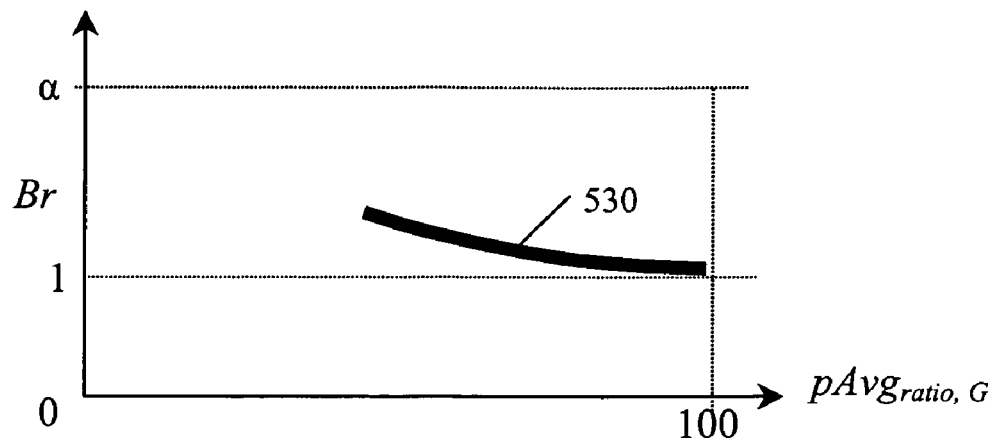
FIG. 23 is a graph generated from the first set of reference data frames, of FIG. 19.

Such a curve 530 is illustrated in FIG. 23. However, this is only part of the full curve that is required; the curve 530 only covers darker images (lower Br values) and higher pAvg values.

Figure 24:
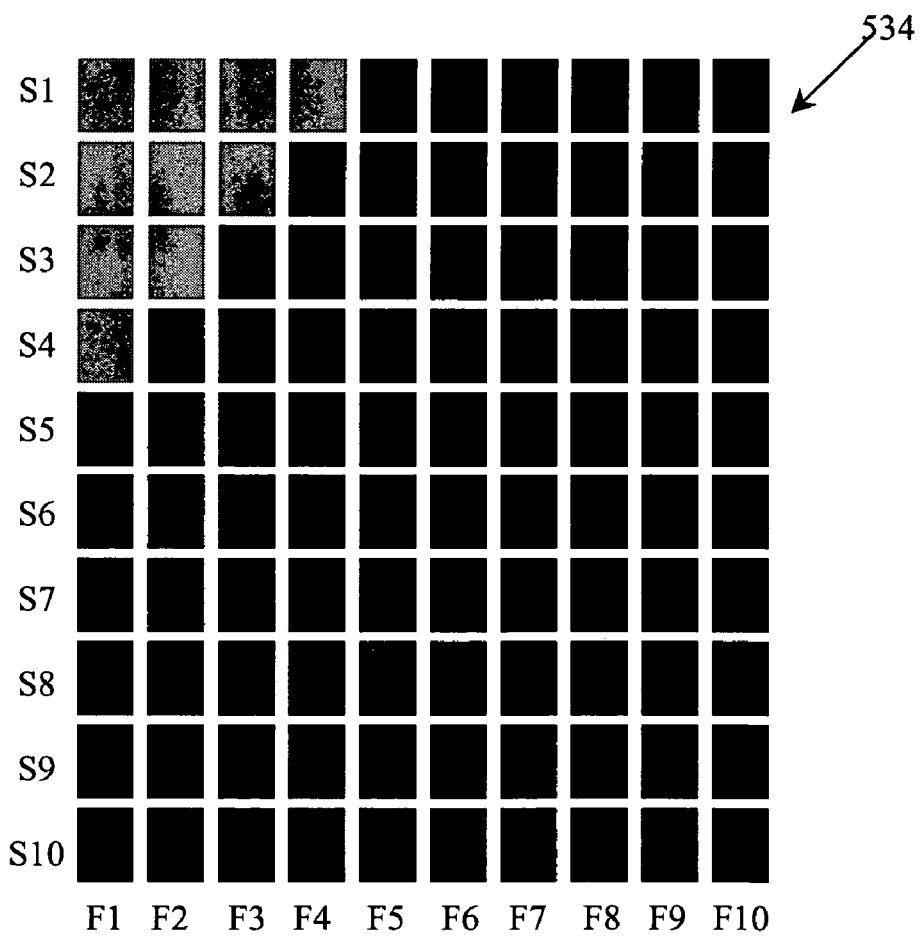
FIG. 24 illustrates a second set of reference data frames for use in generating a full parallax holographic stereogram.

To obtain the rest of the curve for pAvg vs. Br, a further, second set of reference data frames 534 is generated, as shown in FIG. 24. This second set of reference data frames 534 also has 10 series (S1-S10) of 10 frames (F1-F10) each. However, these are all black, except for the first four frames of the first series S1, the first three frames of the second series S2, the first two frames of the third series S3, and the first frame of the fourth series S4. These excepted first four frames of the first series S1 are monochromatic, according to the colour for which the curve is being generated.

A set of identical pre-distorts 536, as illustrated in FIG. 25(a), and a set of identical uncompensated hologels 538, as illustrated in FIG. 25(b), are generated.

A set of Br values and corresponding pAvg values is generated, in a similar manner to that described above with reference to obtaining the curve 530, as illustrated in FIG. 23. The points obtained from this second set of reference data frames 534 have higher brightness Br values and lower pAvg values, thereby allowing the complete reference curve 540 to be plotted, as appears in FIG. 26. The enclosed portion of the curve 542 is that portion obtained through use of the second set of reference data frames 534.

For monochromatic full parallax holographic stereograms, the reference curve 540 can be used to derive attenuation values, for attenuating the pAvg values for the pixels in the pre-distort images for the source data frames being converted into a holographic stereogram. Equations (1) and (3) to (7) described above remain usable as before.

Full Parallax—Coloured System

As with the horizontal-parallax-only coloured system described above, in a full parallax coloured system, where the holographic stereogram comprises more than one of the three RGB components, the predicted brightness, Br, of a single RGB component is affected by the pixel values of the other RGB components. Again a weighting factor, Weight$_X$, is used to compensate for the effect of the pixel values of the other RGB components on the pixel value of the single RGB component. Accordingly, Br may be expressed by Equation (8) given above. However, the curves used to obtain the weighting factors for a horizontal-parallax-only coloured system are not ideal for use with a full parallax system. As such, new curves are ideally generated.

The approach for generating the weighting factor curves for this embodiment of the full parallax coloured system is similar to that used for the horizontal-parallax-only coloured system, as described above with reference to FIGS. 12 and 13, and is now described with reference to FIGS. 27 to 29. This is exemplified by generating the weight curve for green.

Figure 27A:
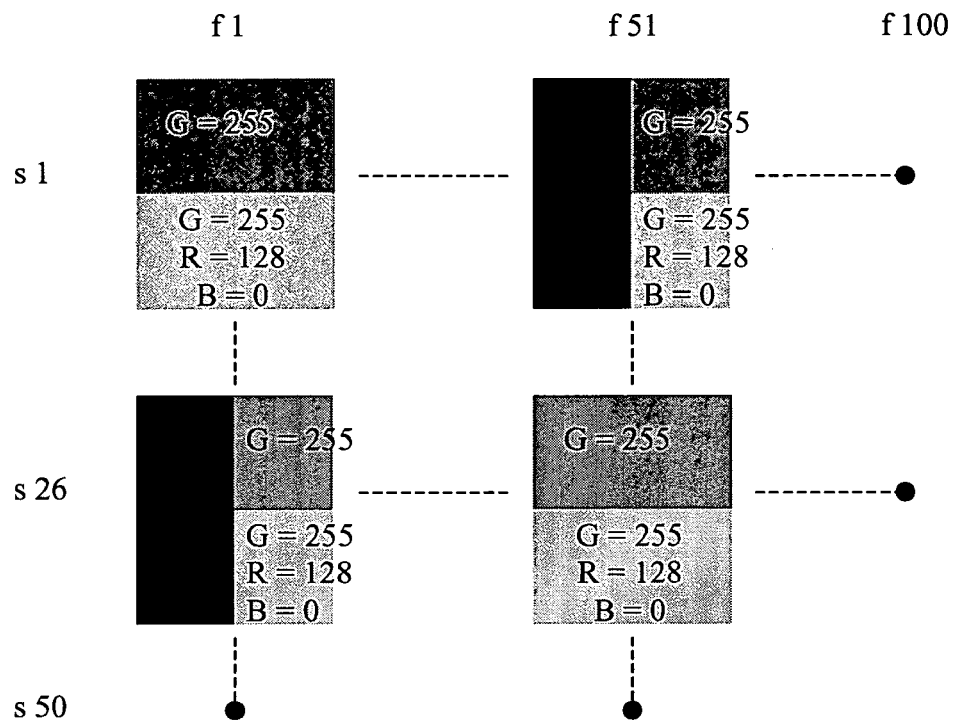
FIG. 27(a) illustrates an array of source data frames for use in generating a reference curve in a coloured full parallax system.
Figure 27B:
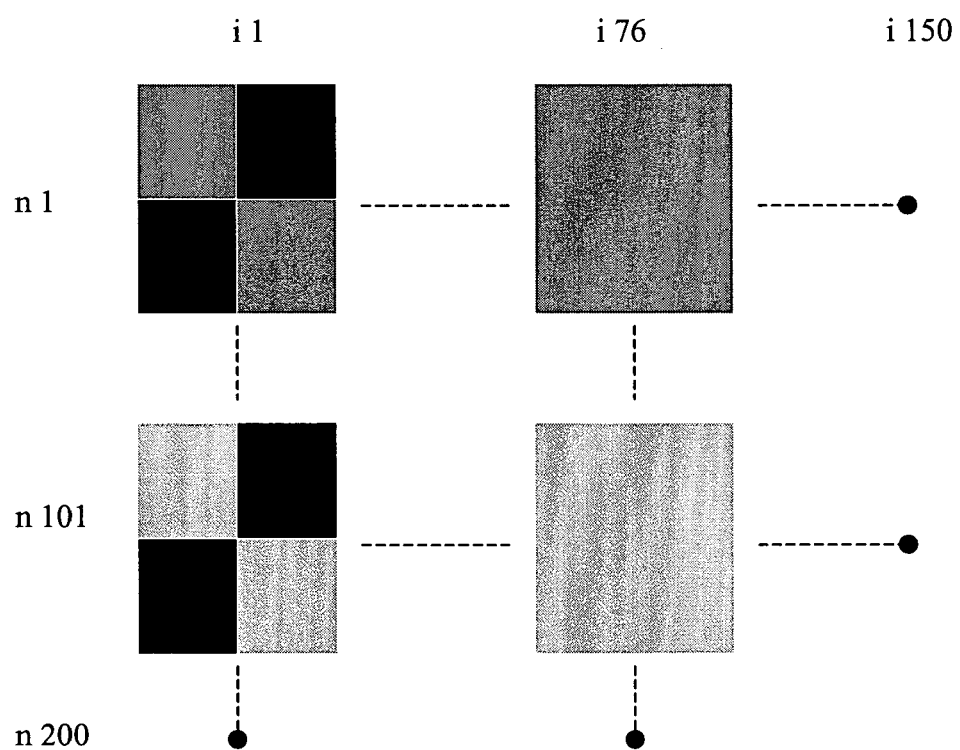
FIG. 27(b) illustrates the resultant array of hologels from the source data frames of FIG. 27(a)

FIG. 27(*a*) illustrates an array of source data frames. This array has 100 frames in each of 50 series. Series S1 to S25 are the same and series S26 to S50 are the same. In series S1 to S25, frames 1 to 50 are all the same, having a layer of green (G=255) above a layer of yellow (G=255, R=128, B=0), and frames 51 to 100 are all the same, being the same as for frames 1 to 50, except that the left half of each frame is black. In series S26 to S50, frames 1 to 50 are all the same as frames 51 to 100 of series S1 to 25 and frames 51 to 100 are all the same as frames 1 to 50 of series S1 to 25.

FIG. 27(*b*) illustrates the resultant array of hologels from the source data frames of FIG. 27(*a*). The full parallax print for the purposes of this example, has 150 columns and 200 rows (e.g. a print of 60×45 mm, each hologel 0.3 mm sq.). Rows n1 to n100 are the same and rows n101 to n200 are the same. In rows n1 to n100, columns i1 to 175 are the same, the hologels are quartered with black in the top right and bottom left and green top left and bottom right, and columns i76 to i150 are the same, being green. In rows n101 to n200, columns i1 to 175 are the same, the hologels are quartered with black in the top right and bottom left and yellow top left and bottom right, and columns i76 to i150 are the same, being yellow.

Figure 28:
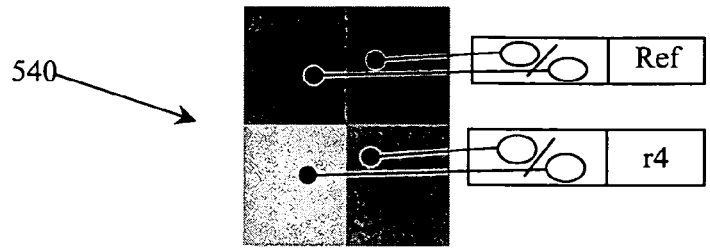
FIG. 28 is an image from a holographic stereogram print having the hologels of FIG. 27(b)

Looking at the full parallax print in a viewing plane similar to the viewing plane 524 in FIGS. 21 and 22, again in the top left corner, the image is that shown in FIG. 28. The image 540 has four distinct quarters, the top left is green and the bottom left is yellow. The top right is also green, but a darker shade of green. The bottom right is also yellow, but again a darker shade of yellow. The ratio of the values of the top right to the top left yields a reference value Ref. The ratio of the values of the bottom right to the bottom left yields a result r4.

Figure 29:
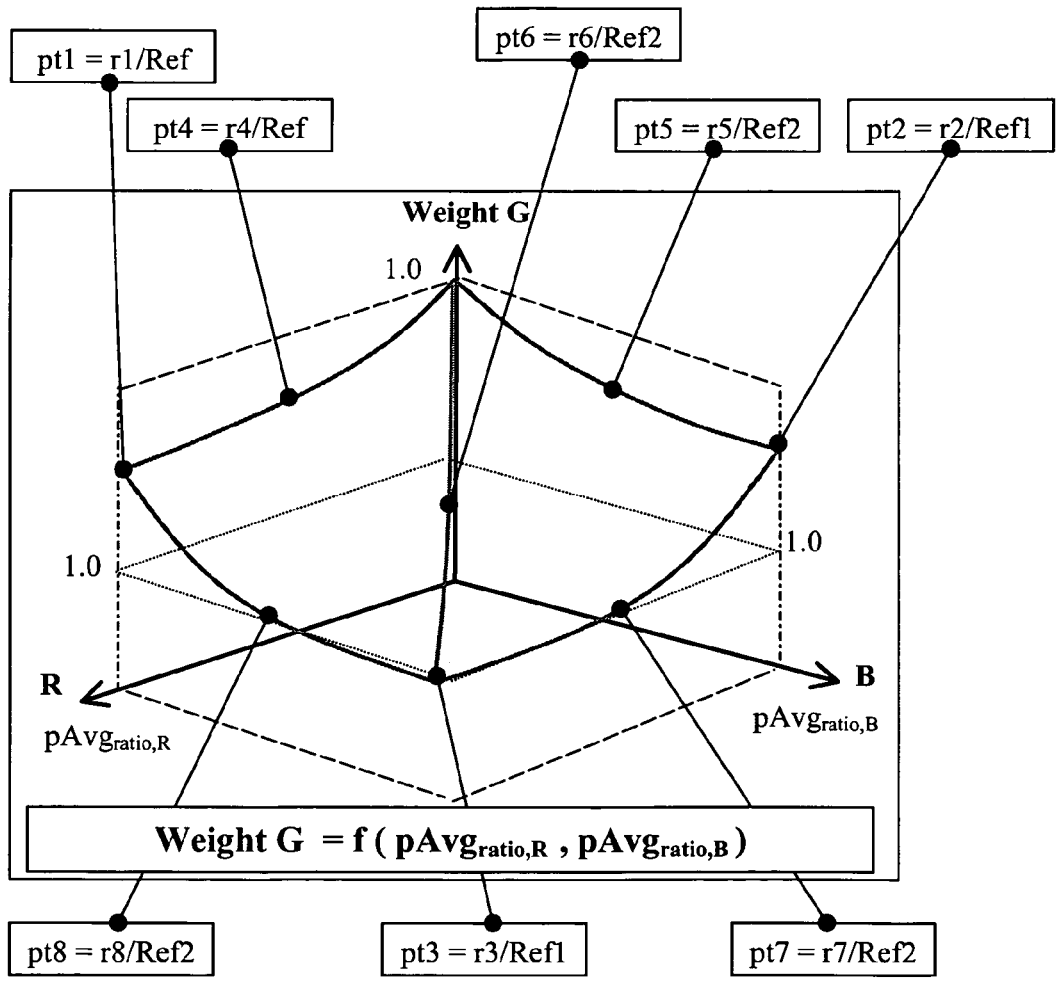
FIG. 29 shows a reference green weighting factor curve, one of the points for which is plotted using values from the image of FIG. 28.

FIG. 29 shows the reference green weighting factor curve, plotted from nine points. The first point pt0 is set for pure green and is set at 1.0 on the Weight$_G$ axis. The remaining eight points are derived from generating full parallax coloured holographic stereograms in a similar manner to that described above with reference to FIGS. 27 and 28.

Pt4 is the value r4/Ref, on the Red-Weight$_G$ plane, for red=0.5, that is the half-way point on the red axis.

Pt1 is generated from source data frames similar to those in FIG. 27, but where the yellow has a red value R=255 (rather than R=128). Values r1 and Ref are derived from an image in a viewing plane for the resulting full parallax coloured holographic stereogram generated from these source frames. Pt1=r1/Ref on the Red-Weight$_G$ plane, for red=1.0.

Pt2 is derived similarly using source data frames where the lower half contains R=0, G=255, B=255. Pt2=r2/Ref on the Blue-Weight$_G$ plane, for blue=1.0.

Pt3 is derived similarly using source data frames where the lower half contains R=255, G=255, B=255. Pt3=r3/Ref at red=1.0 and blue=1.0.

Pt5 is derived similarly using source data frames where the lower half contains R=0, G=255, B=128. Pt5=r5/Ref on the Blue-Weighs plane, for blue=0.5.

Pt6 is derived similarly using source data frames where the lower half contains R=128, G=255, B=128. Pt6=r6/Ref at red=0.5 and blue=0.5.

Pt7 is derived similarly using source data frames where the lower half contains R=128, G=255, B=255. Pt7=r7/Ref at red=0.5 and blue=1.0.

Pt8 is derived similarly using source data frames where the lower half contains R=255, G=255, B=128. Pt8=r8/Ref at red=0.5 and blue=0.5.

For all these calculations, the value Ref should be the same.

Similarly, weighting factor graphs can be generated for Red and Blue.

Equations (9) to (12) given above also apply to full parallax coloured system. Further once the three weighting factor curves have been generated, the compensated pixel value for each of the RGB components of a pixel of a pre-distort image in a full parallax coloured system, palette$_{New}$, can be calculated using the Equations (13) to (21), also given earlier.

Figure 30:
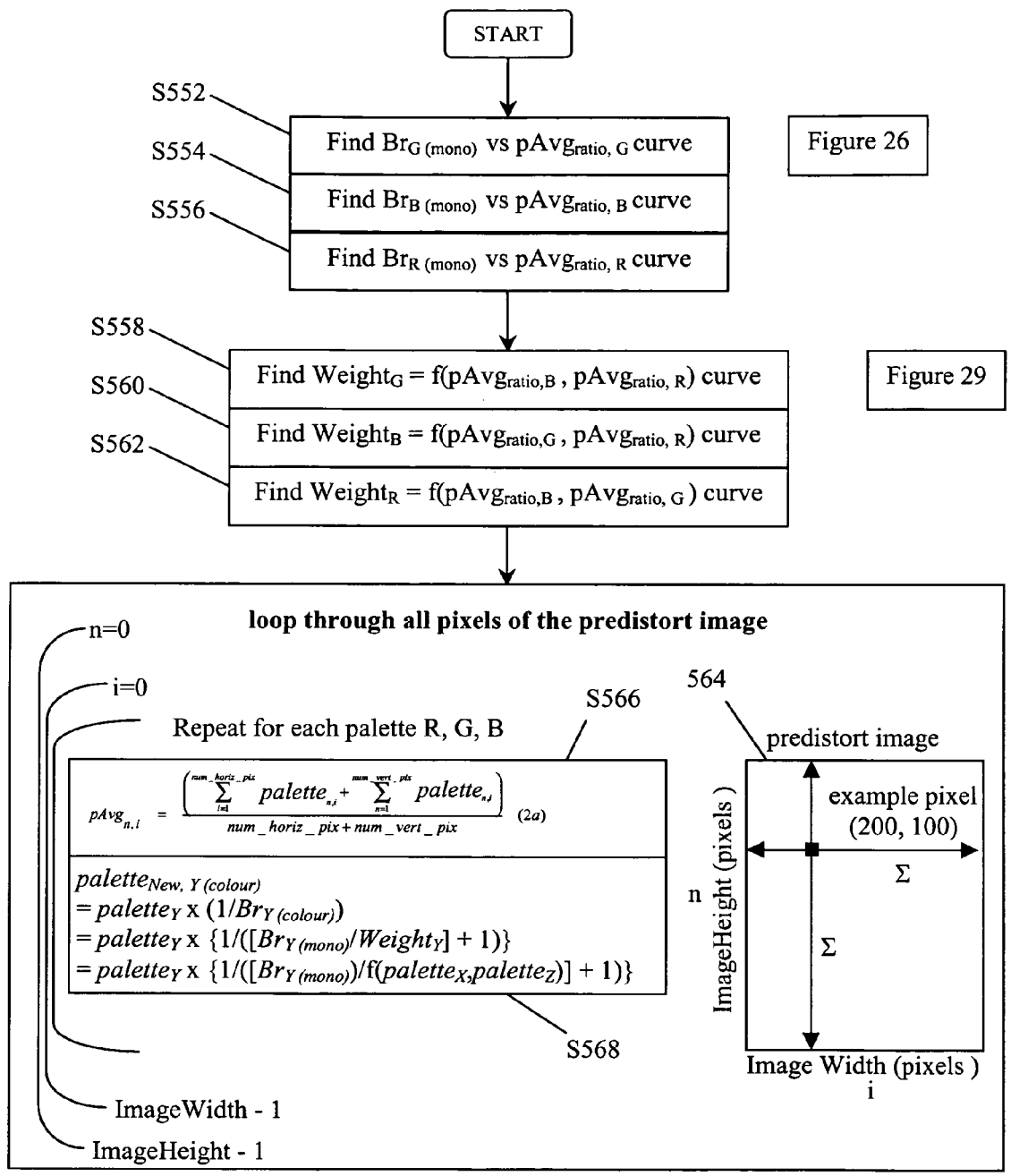
FIG. 30 is a flowchart showing some of the steps involved in generating a coloured full parallax holographic stereogram.

FIG. 30 is a flowchart showing the steps required for performing pixel compensation in generating a coloured holographic stereogram. In steps S552, S554, S556, the curve for Br vs. pAvg$_{ratio}$ is found for each of G, B and R, respectively. In steps S558, S560, S562, the weight factor curve is found for each of G, B and R, respectively. Once these reference curves have been determined, the pixels of the pre-distort images of the source data frames being converted into the holographic stereogram can be compensated. For each pre-distort image 564, pAvg$_{n,i}$ is determined for each pixel at step S566 (Equation (2) for horizontal parallax, Equation (2a) for full parallax), for each of R, G and B. A new palette value is also determined for each pixel, at step S568, using the Br value and weighting factor value from the relevant curves (in FIG. 30 Y represents the current colour, X and Z represent the other two colours).

The flowcharts of FIGS. 14 and 15 are also applicable to full parallax holographic stereograms as they were to the horizontal-parallax-only holographic stereograms.

The processes described above may be implemented using just hardware, with circuits dedicated for the required processing, or by a combination of hardware and software modules, even if the hardware is just that of a conventional computer system.

A module, and in particular the module's functionality, can be implemented in either hardware or software. In the software sense, a module is a process, program, or portion thereof, that usually performs a particular function or related functions. In the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist.

Figure 31:
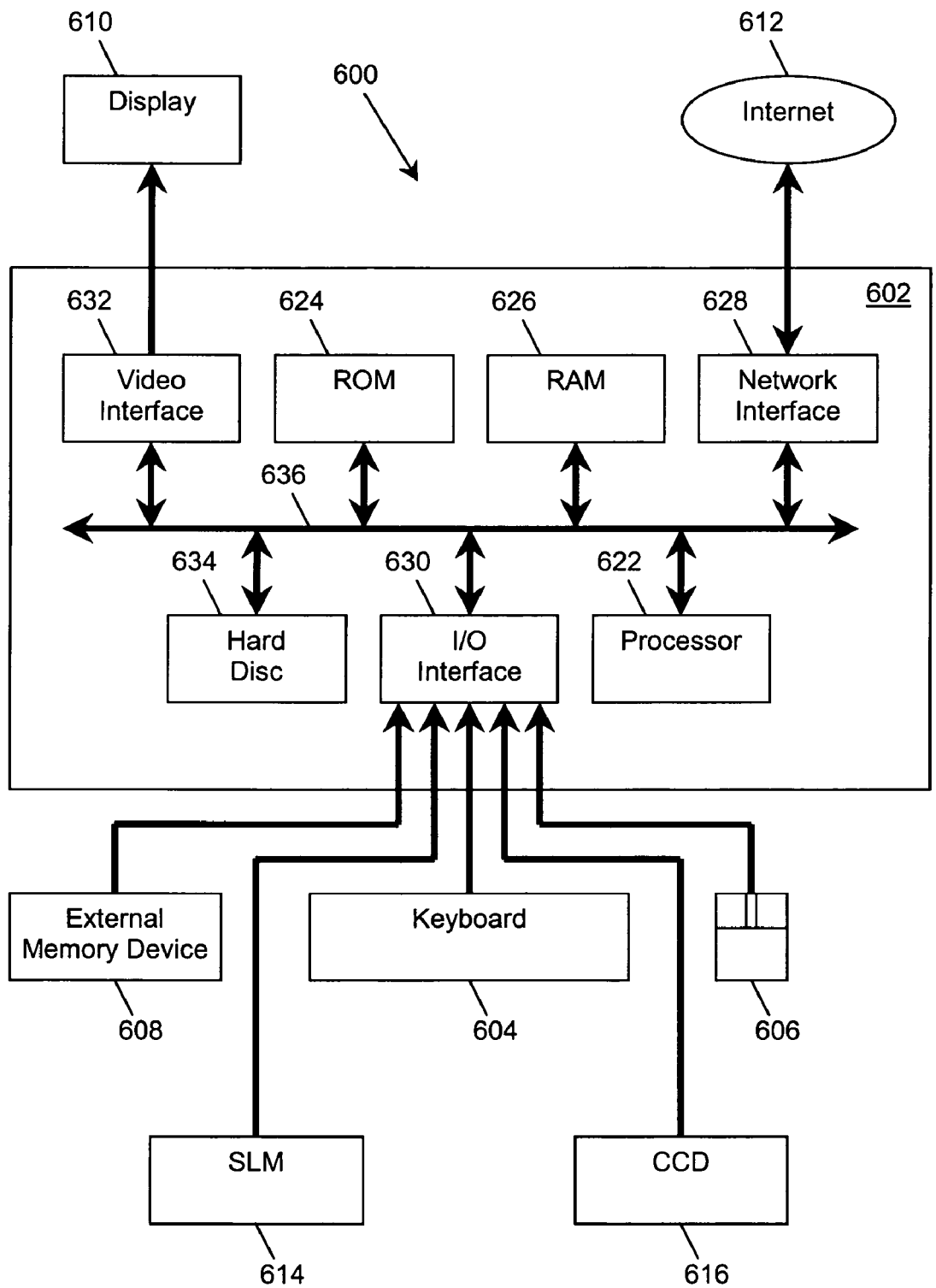
FIG. 31 illustrates a computer system for forming a holographic stereogram from a plurality of source data frames.

FIG. 31 is a schematic representation of a computer system 600 suitable for performing the techniques described with reference to FIGS. 1 to 30. A computer 602 is loaded with suitable software in a memory, which software can be used to perform steps in a process that implement the techniques described herein. Programs can be executed, and results obtained using such a computer system 600. This computer software executes under a suitable operating system installed on the computer system 600.

The computer software involves a set of programmed logic instructions that are able to be interpreted by a processor, such as a CPU, for instructing the computer system 600 to perform predetermined functions specified by those instructions. The computer software can be an expression recorded in any language, code or notation, comprising a set of instructions intended to cause a compatible information processing system to perform particular functions, either directly or after conversion to another language, code or notation.

The computer software is programmed by a computer program comprising statements in an appropriate computer language. The computer program is processed using a compiler into computer software that has a binary format suitable for execution by the operating system. The computer software is programmed in a manner that involves various software components, or code means, that perform particular steps in the process of the described techniques.

The components of the computer system 600 include: the computer 602, input and output devices such as a keyboard 604, a mouse 606 and an external memory device 608 (e.g. one or more of a floppy disc drive, a CD drive, a DVD drive and a USB flash—memory drive) a display 610, network connexions for connecting to the Internet 612, an SLM 614 and a CCD 616 (or other mechanism for determining Br). The computer 602 includes: a processor 622, a first memory such as a ROM 624, a second memory such as a RAM 626, a network interface 628 for connecting to external networks, an input/output (I/O) interface 630 for connecting to the input and output devices, a video interface 632 for connecting to the display, a storage device such as a hard disc 634, and a bus 636.

The processor 622 executes the operating system and the computer software executing under the operating system. The random access memory (RAM) 626, the read-only memory (ROM) 624 and the hard disc 634 are used under direction of the processor 622.

The video interface 632 is connected to the display 610 and provides video signals for display on the display 610. User input, to operate the computer 602 is provided from the keyboard 604 and the mouse 606.

The internal storage device is exemplified here by a hard disc 634 but can include any other suitable non-volatile storage medium.

Each of the components of the computer 602 is connected to the bus 636 that includes data, address, and control buses, to allow these components to communicate with each other.

The computer system 600 can be connected to one or more other similar computers via the Internet, LANs or other networks.

The computer software program may be provided as a computer program product. During normal use, the program may be stored on the hard disc 634. However, the computer software program may be provided recorded on a portable storage medium, e.g. a CD-ROM read by the external memory device 608. Alternatively, the computer software can be accessed directly from the network 612.

In either case, a user can interact with the computer system 600 using the keyboard 604 and the mouse 606 to operate the programmed computer software executing on the computer 602.

Source data frames are input into the processor 622 through the I/O interface 630 or the network interface 628. The processor 622 sections the source data frames and distributes the sectioned source data frames in accordance with a mapping algorithm in a computer program product and downloaded onto the system 600, stored in the memory 626 to form a plurality of pre-distort images.

A compensation algorithm, in a computer program product and downloaded onto the system 600 is also stored in the memory 626. The processor 622 applies the compensation algorithm to the pre-distort images to compensate for variations in the degree of saturation of the pixels in the pre-distort images due to ghosting. If the reference graphs for weighting and attenuation or brightness are to be determined, brightness values are input through use of the CCD 616.

The compensated pre-distort images are output to the SLM 614 via the I/O interface 628 for projection through a converging lens onto a holographic recording medium to form the holographic stereogram.

The computer system 600 is described for illustrative purposes: other configurations or types of computer systems can be equally well used to implement the described techniques. The foregoing is only an example of a particular type of computer system suitable for implementing the described techniques.

Other embodiments of the invention will be apparent to those skilled in the art from consideration of the specification and practice of the invention. Furthermore, certain terminology has been used for the purposes of descriptive clarity, and not to limit the present invention. The embodiments and preferred features described above should be considered exemplary, with the invention being defined by the appended claims and/or as described.

The invention clamed is:

1. A method for forming a holographic stereogram from a plurality of source data frames, the method comprising:
   sectioning a plurality of source data frames into a plurality of sections;
   mapping the plurality of sections to form a plurality of pre-distort images;
   compensating the plurality of pre-distort images for variations in saturation;
   compressing the plurality of pre-distort images to form a plurality of holographic elements; and
   recording the plurality of holographic elements onto a holographic recording medium to form the holographic stereogram.

2. The method according to claim 1, wherein the plurality of pre-distort images is compensated by applying a compensation algorithm to one or more pixels in the plurality of pre-distort images.

3. The method according to claim 2, wherein the compensation algorithm adjusts the one or more pixels in the plurality of pre-distort images to at least partially compensate for a subsequent variation in the degree of saturation when the plurality of holographic elements is recorded onto the holographic recording medium.

4. The method according to claim 2, wherein one or more attenuation factors are applied to one or more pixels in the plurality of pre-distort images.

5. The method according to claim 4, wherein the attenuation factor applied to a pixel reduces a value of the pixel to the level of the lowest predicted non-zero pixel value of the plurality of holographic elements recorded onto the holographic recording medium.

6. The method according to claim 1, further comprising establishing a reference relationship between an averaged pixel value of the plurality of pixels in a plurality of pre-distort images for a second holographic stereogram and a brightness of an image reproduced from the second holographic stereogram.

7. The method according to claim 6, wherein the reference relationship is determined from a series of reference source data frames having colour gradation.

8. The method according to claim 6, wherein the reference relationship is established by:
   (a) generating a series of reference source data frames having colour gradation;
   (b) sectioning and mapping each of the series of reference source data frames to form a set of pre-distort images;
   (c) compressing the set of pre-distort images to form a set of holographic elements;
   (d) recording the set of holographic elements onto a second holographic recording medium to form the second holographic stereogram;
   (e) measuring the brightness of the image reproduced from the second holographic stereogram; and
   (f) plotting a graph of an averaged pixel value of a pixel in the set of pre-distort images against the brightness of the image reproduced from the second holographic stereogram.

9. The method of claim 8, wherein the second holographic recording medium is the same type of medium as the first holographic recording medium.

10. A method of generating a reference relationship between an averaged pixel value in a pre-distort image of a plurality of pre-distort images and the predicted brightness of pixels in an image generated from a holographic stereogram generated from the plurality of pre-distort images, the method comprising:
   (a) generating a series of reference source data frames having colour gradation;
   (b) sectioning and mapping each of the series of reference source data frames to form a set of reference pre-distort images;
   (c) compressing the set of reference pre-distort images to form a set of reference holographic elements;
   (d) recording the set of reference holographic elements onto a holographic recording medium to form a reference holographic stereogram;
   (e) measuring the brightness of an image reproduced from the reference holographic stereogram; and
   (f) plotting a graph of an averaged pixel value of a pixel in the set of reference pre-distort images against the brightness of the image reproduced from the reference holographic stereogram.

11. The method of claim 10, wherein establishing the reference relationship further comprises repeating steps (a) to (e) for a second series of reference source data frames and using the further brightness values to plot more of the graph plotted in step (f).

12. The method according to claim 10, wherein the brightness of the image reproduced from the second holographic stereogram is measured from a plurality of viewing positions.

13. The method according to claim 12, wherein an additional series of source data frames is generated when an interval between each consecutive viewing position is too narrow to obtain a substantially differentiable measurement of the brightness.

14. The method according to claim 10, wherein the averaged pixel value is averaged across a compression axis of the plurality of pre-distort images.

15. The method according to claim 10, wherein the averaged pixel value is averaged across two compression axes of the plurality of pre-distort images, the two axes being orthogonal to each other.

16. The method according to claim 10, wherein the plurality of pre-distort images is compensated based on a predicted brightness of the image reproduced from the holographic stereogram.

17. The method according to claim 16, wherein the predicted brightness of the image is determined from the reference relationship based on the averaged pixel values of the plurality of pre-distort images.

18. The method according to claim 16, further comprising applying a weighting factor to the predicted brightness.

19. The method according to claim 18, wherein the weighting factor is obtained from a graph of the weighting factor of one colour component in a pixel against averaged pixel values for one or more other colour components for the pixel.

20. The method according to claim 19, wherein the graph is established by:
   generating a first set of weighting factor reference source data frames obtaining an image from a stereographic hologram derived from the weighting factor reference source data frames;
   generating a reference ratio from a reference section in the image;
   generating further ratios for other sections in the image;
   dividing each of the further ratios by the reference ratio to obtain a co-ordinate along a weighting factor axis; and
   plotting a plurality of points, each represented by one co-ordinate along the weighting factor axis and one co-ordinate along each averaged pixel value axis of the other colour components in the pixel used to generate the relevant further ratio, to form the graph.

21. A method of establishing a weighting factor relationship between a weighting factor of one colour component in a pixel against an averaged pixel value of colour components for the pixel in a pre-distort image, the method comprising:
   generating, using a processor, a first set of weighting factor reference source data frames
   obtaining an image from a stereographic hologram derived from the weighting factor reference source data frames;
   generating a reference ratio from a reference section in the image;
   generating further ratios for other sections in the image;
   dividing each of the further ratios by the reference ratio to obtain a co-ordinate along a weighting factor axis; and
   plotting a plurality of points, each represented by one co-ordinate along the weighting factor axis and one co-ordinate along each averaged pixel value axis of the other colour components in the pixel used to generate the relevant further ratio, to form the graph.

22. The method of claim 21, wherein the first set of weighting factor reference source data frames comprises at least a first and a second source data frame, each having a plurality of sections, each section having a different combination of colour components, the second source data frame having an area of black on one side.

23. The method according to claim 19, wherein the graph is established by:
   (a) generating a first set of weighting factor reference source data frames of different colour components;
   (b) obtaining an image from a stereographic hologram derived from the first set of weighting factor reference source data frames;
   (c) generating a reference ratio from a reference section in the image;

(d) generating a further ratio for another sections in the image;

(e) dividing the further ratio by the reference ratio to obtain a co-ordinate along a weighting factor axis;

(f) plotting a point, represented by one co-ordinate along the weighting factor axis and one co-ordinate along each averaged pixel value axis of the other colour components in the pixel; and (g) repeating steps (a), (b) and (d) to (f) for one or more further sets of reference source data frames.

24. A method of establishing a weighting factor relationship between a weighting factor of one colour component in a pixel against an averaged pixel value of colour components for the pixel in a pre-distort image, the method comprising:

(a) generating a first set of weighting factor reference source data frames of different colour components;

(b) obtaining an image from a stereographic hologram derived from the first set of weighting factor reference source data frames;

(c) generating a reference ratio from a reference section in the image;

(d) generating a further ratio for another sections in the image;

(e) dividing the further ratio by the reference ratio to obtain a co-ordinate along a weighting factor axis;

(f) plotting a point, represented by one co-ordinate along the weighting factor axis and one co-ordinate along each averaged pixel value axis of the other colour components in the pixel; and (g) repeating steps (a), (b) and (d) to (f) for one or more further sets of reference source data frames.

25. The method of claim 24, wherein the first set of reference source data frames comprises at least a plurality of first source data frames, each of which is the same or similar, and a plurality of second source data frames, each of which is the same or similar, the first source of data frames comprising two bands of a different colour, and the second comprising two bands of the same two colours as those in the source data frames and a third band, of black.

26. A method for use in reducing ghosting in holographic stereograms, wherein a plurality of source data frames are sectioned and the resulting sections mapped to form a plurality of pre-distort images, the method comprising:

compensating the plurality of pre-distort images for variations in saturation.

27. A method of altering pre-distort images for forming a holographic stereogram from a plurality of source data frames, the pre-distort images having been provided by sectioning the source data frames into a plurality of sections and mapping the plurality of sections to form a plurality of pre-distort images, the method comprising:

compensating the plurality of pre-distort images for variations in saturation.

28. A method according to claim 26, further comprising, prior to compensating the plurality of pre-distort images:

sectioning a plurality of source data frames into a plurality of sections; and mapping the plurality of sections to form a plurality of pre-distort images.

29. A method according to claim 26, further comprising:

compressing the plurality of compensated pre-distort images to form a plurality of holographic elements; and recording the plurality of holographic elements onto a holographic recording medium to form the holographic stereogram.

30. A method according to claim 1, wherein the variations in saturation comprise variations in the Diffraction Efficiency of the recording medium onto which the holographic stereogram is to be recorded.

31. A method for use in producing a holographic stereogram on a recording medium with reduced ghosting, comprising pre-compensating for non-linear characteristics of the recording medium.

32. A holographic stereogram formed using a method according to claim 1.

33. Apparatus for forming a holographic stereogram from a plurality of source data frames, comprising:

means for sectioning a plurality of source data frames into a plurality of sections;

means for mapping the plurality of sections to form a plurality of pre-distort images; and means for applying a compensation algorithm to one or more pixels in the plurality of pre-distort images to compensate for variations in saturation.

34. A computer system for forming a holographic stereogram from a plurality of source data frames, the computer system comprising:

an external device interface for receiving the plurality of source data frames;

a processor coupled to the external device interface, operable to section and map the plurality of source data frames to form a plurality of pre-distort images; and a memory coupled to the processor, wherein the memory stores a compensation algorithm for applying to one or more pixels in the plurality of pre-distort images to compensate for variations in saturation.

35. A computer readable medium for storing a computer readable program for carrying out the method of claim 1.

36. A computer-readable medium for storing a computer readable program for forming a holographic stereogram from a plurality of source data frames, said program comprising:

sectioning and mapping the plurality of source data frames to form a plurality of pre-distort images; and applying a compensation algorithm to one or more pixels in the plurality of pre-distort images to compensate for variations in saturation.

37. The computer-readable medium according to claim 36, comprising a computer-readable storage medium having the computer-readable program code stored therein.

* * * * *